(12) United States Patent
Tsubata

(10) Patent No.: US 7,838,881 B2
(45) Date of Patent: Nov. 23, 2010

(54) ACTIVE MATRIX SUBSTRATE, DISPLAY DEVICE, TELEVISION APPARATUS, MANUFACTURING METHOD OF AN ACTIVE MATRIX SUBSTRATE, AND MANUFACTURING METHOD OF A DISPLAY DEVICE

(75) Inventor: Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 346 days.

(21) Appl. No.: 12/063,878

(22) PCT Filed: May 19, 2006

(86) PCT No.: PCT/JP2006/310009

§ 371 (c)(1),
(2), (4) Date: Feb. 15, 2008

(87) PCT Pub. No.: WO2007/034596

PCT Pub. Date: Mar. 29, 2007

(65) Prior Publication Data

US 2009/0251615 A1    Oct. 8, 2009

(30) Foreign Application Priority Data

Sep. 22, 2005    (JP) .............................. 2005-276403

(51) Int. Cl.
G09G 3/30    (2006.01)
H01L 29/04    (2006.01)
H01L 21/00    (2006.01)

(52) U.S. Cl. .......... 257/59; 257/E33.001; 257/E23.112; 438/34; 345/76

(58) Field of Classification Search ................ 348/725; 438/149, 151, 72, 34; 257/213, 59, 72, E33.001; 349/54, 46, 43, 42, 38, 145; 345/98, 88, 345/100, 76

See application file for complete search history.

(56) References Cited

U.S. PATENT DOCUMENTS 5,953,084 A    9/1999    Shimada et al.

(Continued)

FOREIGN PATENT DOCUMENTS

JP    05-333373 A    12/1993

(Continued)

OTHER PUBLICATIONS

Official communication issued in the International Application No. PCT/JP2006/310009, mailed on Jun. 13, 2006.

*Primary Examiner*—Thomas L Dickey
*Assistant Examiner*—Nikolay Yushin
(74) *Attorney, Agent, or Firm*—Keating & Bennett, LLP

(57) ABSTRACT

An active matrix substrate includes: a plurality of pixel electrodes arranged in a matrix pattern and each forming a pixel; a plurality of gate lines each provided between the corresponding pixel electrodes and extending in parallel with each other; a plurality of first source lines each provided between the corresponding pixel electrodes and extending in a direction crossing an extending direction of the gate lines; a plurality of TFTs provided corresponding to the respective pixel electrodes and connected to the respective pixel electrodes, the respective gate lines, and the respective first source lines; a plurality of capacitor lines each provided between the corresponding gate lines and extending in parallel with each other; and a plurality of second source lines each provided between the corresponding pixel electrodes and extending in parallel with the first source lines.

25 Claims, 13 Drawing Sheets

U.S. PATENT DOCUMENTS

| | | | |
|---|---|---|---|
| 6,052,162 | A | 4/2000 | Shimada et al. |
| 6,072,559 | A | 6/2000 | Kanemori et al. |
| 6,097,452 | A | 8/2000 | Shimada et al. |
| 6,195,138 | B1 | 2/2001 | Shimada et al. |
| 6,433,851 | B2 | 8/2002 | Shimada et al. |
| 6,661,488 | B1 | 12/2003 | Takeda et al. |
| 6,724,452 | B1 | 4/2004 | Takeda et al. |
| 7,167,224 | B1 | 1/2007 | Takeda et al. |
| 7,224,421 | B1 | 5/2007 | Takeda et al. |
| 7,227,606 | B2 | 6/2007 | Takeda et al. |
| 7,304,703 | B1 | 12/2007 | Takeda et al. |
| 2001/0002857 | A1 | 6/2001 | Shimada et al. |
| 2004/0001167 | A1* | 1/2004 | Takeuchi et al. ............... 349/38 |
| 2005/0122441 | A1 | 6/2005 | Shimoshikiryoh |
| 2007/0064187 | A1 | 3/2007 | Takeda et al. |

FOREIGN PATENT DOCUMENTS

| | | |
|---|---|---|
| JP | 10-123563 A | 5/1998 |
| JP | 10-232412 A | 9/1998 |
| JP | 2001-117083 A | 4/2001 |
| JP | 2002-116712 A | 4/2002 |

* cited by examiner

ACTIVE MATRIX SUBSTRATE, DISPLAY DEVICE, TELEVISION APPARATUS, MANUFACTURING METHOD OF AN ACTIVE MATRIX SUBSTRATE, AND MANUFACTURING METHOD OF A DISPLAY DEVICE

BACKGROUND OF THE INVENTION

1. Field of the Invention

The present invention relates to an active matrix substrate forming a display device such as a liquid crystal display device and an EL (electroluminescence) display device. More particularly, the present invention relates to a defect repair technology for an active matrix substrate.

2. Description of the Related Art

An active matrix substrate has been widely used in display devices such as a liquid crystal display device and an EL display device. For example, an active matrix substrate forming a liquid crystal display device is disclosed in Japanese Laid-Open Patent Publication No. 9-152625.

FIG. 14 is a plan view of a single pixel of a conventional active matrix substrate 120. This active matrix substrate 120 includes a plurality of pixel electrodes 112 arranged in a matrix pattern, TFTs (Thin Film Transistors) 105 respectively corresponding to the pixel electrodes 112, a plurality of gate lines 101 extending in parallel with each other between the pixel electrodes 112, a plurality of source lines 103 extending in parallel with each other between the pixel electrodes 112 in a direction crossing the extending direction of the gate lines 101, and capacitor lines 102 extending in parallel with each other between the gate lines 101.

Each TFT 105 includes a gate electrode 101a connected to a corresponding gate line 101, a semiconductor layer 104 covering the gate electrode 101a, a source electrode 103a formed over the semiconductor layer 104 and connected to a corresponding source line 103, and a drain electrode 103b facing the source electrode 103a over the semiconductor layer 104. The drain electrode 103b is extended to a region where a corresponding capacitor line 102 extends, so as to serve as an extended drain electrode 107 and a capacitor electrode 106. The extended drain electrode 107 and the capacitor electrode 106 are connected to a corresponding pixel electrode 112 through a contact hole 111b.

In a liquid crystal display device (a liquid crystal display panel) including the active matrix substrate 120, a counter substrate having a common electrode, and a liquid crystal layer interposed between the active matrix substrate 120 and the counter substrate and including liquid crystal molecules, an image is displayed by transmitting as appropriate an image signal to the pixel electrodes 112 connected to the respective TFTs 105 by using a switching function of the TFTs 105. In the active matrix substrate 120, an auxiliary capacitor is formed between each capacitor line 102 and each capacitor electrode 106 in order to prevent self-discharge of the liquid crystal layer during an off-state period of the TFTs 105 or to prevent degradation of an image signal due to an off-state current of the TFTs 105, and for use as, for example, a path for applying various modulating signals for liquid crystal driving.

Recently, in order to implement a wider viewing angle, a VA (Vertical Alignment) mode liquid crystal display device having multi-domains, i.e., an MVA (Multi-domain Vertical Alignment) mode liquid crystal display device, has been widely used in a large size liquid crystal television apparatus (liquid crystal TV) and the like (for example, see Japanese Laid-Open Patent Publication No. 2001-83523).

In such an MVA mode liquid crystal display device, an incision pattern (a slit portion) or a projection for controlling orientation of liquid crystal molecules is formed in pixel electrodes of an active matrix substrate and a common electrode of a counter substrate in order to form a fringe field. A wider viewing angle is implemented by distributing the orientation direction of the liquid crystal molecules in a plurality of directions by using the fringe field. Japanese Laid-Open Patent Publication No. 2001-117083 discloses a technology of embedding an electrode at a location corresponding to the incision pattern of the pixel electrode and the common electrode in order to prevent light leakage and to improve an initial response speed after voltage application.

In a manufacturing process of an active matrix substrate, foreign particles on the substrate or the like may cause gate line disconnection. A normal voltage (a drain voltage) cannot be applied to pixel electrodes on the disconnected gate line. Therefore, dot defects are visually recognized as a line defect along the disconnected gate line on the display screen of the liquid crystal display device. A liquid crystal display device becomes defective as the number of such line defects increases. As a result, manufacturing yield of the liquid crystal display device is reduced.

For example, Japanese Laid-Open Patent Publication No. 5-333373 discloses an active matrix liquid crystal display device having a repairing crossing portion in order to repair gate line disconnection. The repairing crossing portion is formed in the same layer as a capacitor line and has portion overlapping a pixel electrode and a source electrode.

However, a method for repairing a liquid crystal display device described in Japanese Laid-Open Patent Publication No. 5-333373 has the following problem: when disconnection is repaired, a pixel adjacent to a pixel corresponding to the disconnected location does not function normally, resulting in a pixel defect.

SUMMARY OF THE INVENTION

In order to overcome the problems described above, preferred embodiments of the present invention provide a structure and method of repairing disconnection while suppressing generation of pixel defects.

A preferred embodiment according of the present invention includes a first source line and a second source line extending in parallel with each other between pixel electrodes, and a capacitor line crossing the first source line and the second source line.

More specifically, an active matrix substrate according to a preferred embodiment of the present invention includes a plurality of pixel electrodes arranged in a matrix pattern and each forming a pixel; a plurality of gate lines each provided between the corresponding pixel electrodes and extending in parallel with each other; a plurality of first source lines each provided between the corresponding pixel electrodes and extending in a direction crossing an extending direction of the gate lines; a plurality of switching elements provided corresponding to the respective pixel electrodes and connected to the respective pixel electrodes, the respective gate lines, and the respective first source lines; a plurality of capacitor lines each provided between the corresponding gate lines and extending in parallel with each other; and a plurality of second source lines each provided between the corresponding pixel electrodes and extending in parallel with the first source lines.

With the above-described structure, when a gate line has disconnection, each of the second source lines provided along both sides of a pixel electrode of a pixel corresponding to the disconnected location of the gate line is cut at a position located beyond a capacitor line extending across the pixel electrode of the pixel corresponding to the disconnected location and a position located beyond the disconnected gate line. Each of source line bypassing portions thus formed has a portion overlapping this capacitor line and a portion overlapping the disconnected gate line. In addition, the capacitor line extending across the pixel electrode of the pixel corresponding to the disconnected location is cut at a position located beyond each second source line provided along both sides of the pixel electrode of the pixel corresponding to the disconnected location. A capacitor line bypassing portion thus formed has a portion overlapping one of the second source lines and a portion overlapping the other second source line. Thereafter, the respective portions of the source line bypassing portions overlapping the gate line is connected with the disconnected gate line, and the respective portions of the source line bypassing portions overlapping the capacitor line are connected with the capacitor line bypassing portion. As a result, a scanning signal is supplied to the downstream of the disconnected location of the gate line through the source line bypassing portions and the capacitor bypassing portion.

When a source line, that is, a first source line connected to switching elements, has disconnection, a capacitor line extending across a pixel electrode of a pixel corresponding to the disconnected location is cut at positions located outside the disconnected first source line and a second source line adjacent to the first source line. A capacitor line bypassing portion thus formed has a portion overlapping the disconnected first source line and a portion overlapping the second source line adjacent to the disconnected first source line. Thereafter, the portion of the capacitor line bypassing portion overlapping the first source line is connected with the disconnected first source line, and the portion of the capacitor line bypassing portion overlapping the second source line is connected with the second source line. As a result, a data signal is supplied to the downstream of the disconnected location of the first source line through the second source line and the capacitor line bypassing portion.

Unlike a conventional method, it is not necessary to use a pixel electrode as a bypass for repairing disconnection. Therefore, disconnection can be repaired while suppressing generation of pixel defects.

Moreover, since the gate lines and the capacitor lines are formed independently, load on the gate line is reduced and signal delay on the gate line can be improved.

The first source line and the second source line may be connected to each other.

In the above-described structure, a data signal is applied to both the first source line and the second source line. Therefore, when disconnection of a source line, more specifically, disconnection of a first source line connected to switching elements, is repaired and a second source line is used, it is not necessary to apply a data signal directly to the second source line and to connect the first source line and the second source line to each other.

Each of the capacitor lines may be formed by a first capacitor line and a second capacitor line that extend in parallel with each other.

In the above-described structure, when disconnection of a gate line or a source line is repaired, for example, a portion of the first capacitor line is cut to form a capacitor line bypassing portion. However, since the second capacitor line is not cut and functions as an auxiliary capacitor, disconnection can be repaired while suppressing degradation in display quality as much as possible.

The first capacitor line and the second capacitor line may be connected to each other.

In the above-described structure, a connection terminal with an external driving circuit can be shared and it is not necessary to provide an additional external driving circuit.

Each of the capacitor lines may be extended at every pixel so as to have a capacitor line extension portion extending along the capacitor line and having a portion overlapping a corresponding first source line and a portion overlapping a corresponding second source line.

In the above-described structure, when a capacitor line has disconnection, a first source line and a second source line provided on both sides of a pixel electrode of a pixel corresponding to the disconnected location of the capacitor line are cut in order to form source line bypassing portions each having a portion overlapping the capacitor line and a portion overlapping the capacitor line extension portion. Each of the source line bypassing portions is then connected to the disconnected capacitor line and the capacitor line extension portion.

An auxiliary capacitor signal can thus be supplied to the downstream of the disconnected location of the capacitor line through the source line bypassing portions and the capacitor line extension portion. Accordingly, disconnection of the capacitor line can be repaired while suppressing generation of pixel defects.

Capacitor electrodes may be provided so as to overlap the respective capacitor lines with a dielectric film interposed therebetween.

In the above-described structure, an auxiliary capacitor is formed by a capacitor line, a capacitor electrode, and a dielectric film such as a gate insulating film between the capacitor line and the capacitor electrode. This is preferably applied in the case where an interlayer insulating film on the order of several microns is formed from a photosensitive resin or the like between the layer in which the pixel electrodes are formed and the layer in which the first source lines and the second source lines are formed. Therefore, the first source lines and the second source lines can be formed so as to overlap the corresponding pixel electrodes. This structure increases an effective pixel area, enabling improvement in an aperture ratio.

An interlayer insulating film may be provided between the switching elements and the capacitor electrodes and the pixel electrodes. Each switching element may have a drain electrode connected to the corresponding pixel electrode, and the drain electrodes and the capacitor electrodes are connected to the respective pixel electrodes through respective contact holes formed in the interlayer insulating film.

In the above-described structure, even when a capacitor line and a capacitor electrode are short-circuited and an auxiliary capacitor formed between the capacitor line and the capacitor electrode is cut and separated, that is, even when an auxiliary capacitor having a capacitor electrode connected to a pixel electrode through one contact hole is cut and separated, a data signal from the first source line is supplied to the pixel electrode through another contact hole. Therefore, pixel defects resulting from a short-circuited auxiliary capacitor can be repaired.

The drain electrode may be extended and connected to a corresponding capacitor electrode.

In the above-described structure, even when a drain electrode and a corresponding pixel electrode are electrically disconnected from each other due to a defective contact hole formed in the interlayer insulating film on the drain electrode, a data signal can be supplied to the pixel electrode through the extended portion of the drain electrode.

Moreover, even when the extended portion of the drain electrode has disconnection, a data signal is supplied to the capacitor electrode through the contact hole formed in the interlayer insulating film on the drain electrode and the pixel electrode.

Each pixel electrode may have a slit portion for dividing orientation of liquid crystal molecules or a projection for controlling orientation of liquid crystal molecules so that the slit portion and the projection overlap a corresponding capacitor line.

In the above-described structure, the region where the slit portion for dividing orientation of liquid crystal molecules or the projection for controlling orientation of liquid crystal molecules is formed usually does not function as a transparent region. Therefore, by forming each capacitor line so that the capacitor line overlaps this region, reduction in the aperture ratio resulting from formation of an auxiliary capacitor can be suppressed. Such an active matrix substrate is preferably used in an MVA mode liquid crystal display device.

Adjacent pixels of the plurality of pixels may form a pixel group, and at least two pixels of the pixel group may be different in luminance when an image is displayed.

In the above-described structure, in an active matrix substrate in which pixels of the pixel group are individually driven by respective switching elements, that is, in an active matrix substrate capable of multi-pixel driving, both a bright pixel and a dark pixel can be present in each pixel group, and intermediate gray scales can be expressed by area gradation. As a result, whitening at oblique viewing angles on the display screen of the liquid crystal display device can be improved. For example, each pixel group can have both a bright pixel and a dark pixel as described above when signal voltages of opposite phases are applied to the capacitor lines extending across the corresponding pixel electrodes of the pixel group. More specifically, area gradation technology uses two kinds of Cs waveform voltages, that is, a Cs waveform voltage (Cs polarity +) contributing to pushing up a drain signal voltage (Vs) supplied from the source line at timing for capacitive coupling when a gate signal is off, and a Cs waveform voltage (Cs polarity −) contributing to pushing down the Vs. By using the area gradation technology, an effective voltage to be applied to each pixel group is varied on a pixel by pixel basis by capacitive coupling of the Cs waveform voltage, Cs capacitor, and liquid crystal capacitor, whereby bright and dark pixels can be formed. Examples of such a pixel division structure for providing display by using pixel division of each pixel group include a 1:1 pixel division structure in which the area of the bright pixel and the area of the dark pixel are equal to each other and a 1:3 pixel division structure in which the area of the bright pixel is one third of the area of the dark pixel. Among them, the 1:3 pixel division structure is particularly effective as a measure for whitening at oblique viewing angles on the display screen of the liquid crystal display device (a measure to implement a wider viewing angle).

Accordingly, disconnection can be repaired also in the active matrix substrate capable of multi-pixel driving without degrading the effect of improving whitening.

Each of an area of a region where each first source line overlaps a corresponding capacitor line and an area of a region where each second source line overlaps a corresponding capacitor line is preferably about 25 $\mu m^2$ or more.

In the above-described structure, a sufficient laser radiation region is ensured in the process of melting an insulating film between the first source line and the second source line and the capacitor line by using a yttrium-aluminum-garnet (YAG) laser or the like. As a result, improved reliability of electric conduction between the first source line and the second source line and the capacitor line can be implemented.

According to another preferred embodiment of the present invention, a display device includes the active matrix substrate according to the above-described preferred embodiment of the present invention.

In the above-described structure, disconnection in the active matrix substrate is repaired while suppressing generation of pixel defects. Therefore, manufacturing yield of the display device can be improved.

According to a preferred embodiment of the present invention, a television apparatus includes the display device according to another preferred embodiment of the present invention and a tuner portion for receiving television broadcasting.

In the above-described structure, disconnection in the active matrix substrate of the display device is repaired while suppressing generation of pixel defects. Therefore, manufacturing yield of the television apparatus can be improved.

In a manufacturing method of an active matrix substrate according to a preferred embodiment of the present invention, the active matrix substrate includes a plurality of pixel electrodes arranged in a matrix pattern and each forming a pixel, a plurality of gate lines each provided between the corresponding pixel electrodes and extending in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending in parallel with each other, and a plurality of second source lines each provided between the corresponding pixel electrodes and extending in parallel with the first source lines.

The manufacturing method preferably includes the step of detecting disconnection of a gate line; the step of forming a source line bypassing portion by cutting each second source line provided along both sides of a pixel electrode of a pixel corresponding to a disconnected location of the gate line detected in the disconnection detecting step at a position located beyond a capacitor line extending across the pixel electrode and a position located beyond the disconnected gate line, so that each source line bypassing portion has a portion overlapping the capacitor line and a portion overlapping the gate line; the step of forming a capacitor line bypassing portion by cutting the capacitor line extending across the pixel electrode of the pixel corresponding to the disconnected location of the gate line detected in the disconnection detecting step at a position located beyond each second source line provided along both sides of the pixel electrode of the pixel corresponding to the disconnected location, so that the capacitor line bypassing portion has a portion overlapping one of the second source lines and a portion overlapping another second source line; and the step of connecting the respective portions of the source line bypassing portions overlapping the gate line with the disconnected gate line and connecting the respective portions of the source line bypassing portions overlapping the capacitor line with the capacitor line bypassing portion.

According to the above-described method, in the step of forming a source line bypassing portion, the source line bypassing portions each having a portion overlapping the disconnected gate line and a portion overlapping the capacitor line are formed on both sides of the pixel electrode of the pixel corresponding to the disconnected location of the gate line detected in the disconnection detecting step. In the step of forming a capacitor line bypassing portion, the capacitor line bypassing portion having portions respectively overlapping the second source lines provided on both sides of the pixel electrode of the pixel corresponding to the disconnected location of the gate line is formed. In the connecting step, the source line bypassing portions are connected to the disconnected gate line and the capacitor line bypassing portion. A scanning signal is thus supplied to the downstream of the disconnected location of the gate line through the source line bypassing portions and the capacitor line bypassing portion. Unlike a conventional method, it is not necessary to use a pixel electrode as a bypass for repairing disconnection. Therefore, disconnection of the gate line is repaired while suppressing generation of pixel defects.

In a manufacturing method of an active matrix substrate according to a preferred embodiment of the present invention, the active matrix substrate includes a plurality of pixel electrodes arranged in a matrix pattern and each forming a pixel, a plurality of gate lines each provided between the corresponding pixel electrodes and extending in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending in parallel with each other, and a plurality of second source lines each provided between the corresponding pixel electrodes and extending in parallel with the first source lines. The manufacturing method includes: the step of detecting disconnection of a first source line; the step of forming a capacitor line bypassing portion by cutting a capacitor line extending across a pixel electrode of a pixel corresponding to a disconnected location of the first source line detected in the disconnection detecting step at positions located outside the disconnected first source line and a second source line adjacent to the first source line, so that the capacitor line bypassing portion has a portion overlapping the first source line and a portion overlapping the second source line; and the step of connecting the portion of the capacitor line bypassing portion overlapping the first source line with the disconnected first source line and connecting the portion of the capacitor line bypassing portion overlapping the second source line with the second source line.

According to the above-described method, in the step of forming a capacitor line bypassing portion, the capacitor line bypassing portion having a portion overlapping the first source line and a portion overlapping the second source line is formed so as to extend in the pixel electrode of the pixel corresponding to the disconnected location of the first source line detected in the disconnection detecting step. In the connecting step, the capacitor line bypassing portion is connected to the first source line and the second source line. As a result, a data signal is supplied to the downstream of the disconnected location of the source line through the second source line and the capacitor line bypassing portion. Accordingly, disconnection of the source line can be repaired while suppressing generation of pixel defects.

In a manufacturing method of an active matrix substrate according to a preferred embodiment of the present invention, the active matrix substrate includes a plurality of pixel electrodes arranged in a matrix pattern and each forming a pixel, a plurality of gate lines each provided between the corresponding pixel electrodes and extending in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending in parallel with each other, a plurality of second source lines each provided between the corresponding pixel electrodes and extending in parallel with the first source lines, and a capacitor line extension portion extended from each capacitor line at every pixel so as to extend along the capacitor line and having a portion overlapping a corresponding first source line and a portion overlapping a corresponding second source line. The manufacturing method includes: the step of detecting disconnection of a capacitor line; the step of forming a source line bypassing portion by cutting a first source line and a second source line provided along both sides of a pixel electrode of a pixel corresponding to a disconnected location of the capacitor line detected in the disconnection detecting step at a position located beyond the disconnected capacitor line and a position located beyond a capacitor line extension portion extended from the capacitor line, so that each source line bypassing portion has a portion overlapping the capacitor line and a portion overlapping the capacitor line extension portion; and the step of connecting the respective portions of the source line bypassing portions overlapping the capacitor line with the disconnected capacitor line and connecting the respective portions of the source line bypassing portions overlapping the capacitor line extension portion with the capacitor line extension portion.

According to the above-described method, in the step of forming a source line bypassing portion, the source line bypassing portions each having a portion overlapping the capacitor line and a portion overlapping the capacitor line extension portion are formed on both sides of the pixel electrode of the pixel corresponding to the disconnected location of the capacitor line detected in the disconnection detecting step. In the connecting step, the source line bypassing portions are connected to the disconnected capacitor line and the capacitor line extension portion. An auxiliary capacitor signal is thus supplied to the downstream of the disconnected location of the capacitor line through the source line bypassing portions and the capacitor line extension portion. Therefore, disconnection of the capacitor line is repaired while suppressing generation of pixel defects.

The cutting and the connection may be conducted by laser radiation.

The above-described method enables reliable cutting and connection of wirings.

The cutting may be conducted by a fourth harmonic wave of a YAG laser.

The above-described method improves reliability of breakage and separation of the first source line, the second source line, and the capacitor line by laser radiation.

The connection may be conducted by a second harmonic wave of a YAG laser.

The above-described method improves reliability of laser fusion bonding between the source line bypassing portion and the gate line, between the source line bypassing portion and the capacitor line bypassing portion, between the capacitor line bypassing portion and the first source line, between the capacitor line bypassing portion and the second source line, between the source line bypassing portion and the capacitor line, and between the source line bypassing portion and the capacitor line extension portion.

In a manufacturing method of a display device having an active matrix substrate according to a preferred embodiment of the present invention, the active matrix substrate includes a plurality of pixel electrodes arranged in a matrix pattern and each forming a pixel, a plurality of gate lines each provided between the corresponding pixel electrodes and extending in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending in parallel with each other, and a plurality of second source lines each provided between the corresponding pixel electrodes and extending in parallel with the first source lines. The manufacturing method includes: the step of detecting disconnection of a gate line; the step of forming a source line bypassing portion by cutting each second source line provided along both sides of a pixel electrode of a pixel corresponding to a disconnected location of the gate line detected in the disconnection detecting step at a position located beyond a capacitor line extending across the pixel electrode and a position located beyond the disconnected gate line, so that each source line bypassing portion has a portion overlapping the capacitor line and a portion overlapping the gate line; the step of forming a capacitor line bypassing portion by cutting the capacitor line extending across the pixel electrode of the pixel corresponding to the disconnected location of the gate line detected in the disconnection detecting step at a position located beyond each second source line provided along both sides of the pixel electrode of the pixel corresponding to the disconnected location, so that the capacitor line bypassing portion has a portion overlapping one of the second source lines and a portion overlapping another second source line; and the step of connecting the respective portions of the source line bypassing portions overlapping the gate line with the disconnected gate line and connecting the respective portions of the source line bypassing portions overlapping the capacitor line with the capacitor line bypassing portion.

According to the above-described method, in the step of forming a source line bypassing portion, the source line bypassing portions each having a portion overlapping the disconnected gate line and a portion overlapping the capacitor line are formed on both sides of the pixel electrode of the pixel corresponding to the disconnected location of the gate line detected in the disconnection detecting step. In the step of forming a capacitor line bypassing portion, the capacitor line bypassing portion having portions respectively overlapping the second source lines provided on both sides of the pixel electrode of the pixel corresponding to the disconnected location of the gate line is formed. In the connecting step, the source line bypassing portions are connected to the disconnected gate line and the capacitor line bypassing portion. A scanning signal is thus supplied to the downstream of the disconnected location of the gate line through the source line bypassing portions and the capacitor line bypassing portion. Unlike a conventional method, it is not necessary to use a pixel electrode as a bypass for repairing disconnection. Therefore, disconnection of the gate line is repaired while suppressing generation of pixel defects.

In a manufacturing method of a display device having an active matrix substrate according to a preferred embodiment of the present invention, the active matrix substrate includes a plurality of pixel electrodes arranged in a matrix pattern and each forming a pixel, a plurality of gate lines each provided between the corresponding pixel electrodes and extending in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending in parallel with each other, and a plurality of second source lines each provided between the corresponding pixel electrodes and extending in parallel with the first source lines. The manufacturing method includes the step of detecting disconnection of a first source line; the step of forming a capacitor line bypassing portion by cutting a capacitor line extending across a pixel electrode of a pixel corresponding to a disconnected location of the first source line detected in the disconnection detecting step at positions located outside the disconnected first source line and a second source line adjacent to the first source line, so that the capacitor line bypassing portion has a portion overlapping the first source line and a portion overlapping the second source line; and the step of connecting the portion of the capacitor line bypassing portion overlapping the first source line with the disconnected first source line and connecting the portion of the capacitor line bypassing portion overlapping the second source line with the second source line.

According to the above-described method, in the step of forming a capacitor line bypassing portion, the capacitor line bypassing portion having a portion overlapping the first source line and a portion overlapping the second source line is formed so as to extend in the pixel electrode of the pixel corresponding to the disconnected location of the first source line detected in the disconnection detecting step. In the connecting step, the capacitor line bypassing portion is connected to the first source line and the second source line. As a result, a data signal is supplied to the downstream of the disconnected location of the source line through the second source line and the capacitor line bypassing portion. Accordingly, disconnection of the source line can be repaired while suppressing generation of pixel defects.

In a manufacturing method of a display device having an active matrix substrate according to a preferred embodiment of the present invention, the active matrix substrate includes a plurality of pixel electrodes arranged in a matrix pattern and each forming a pixel, a plurality of gate lines each provided between the corresponding pixel electrodes and extending in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending in parallel with each other, a plurality of second source lines each provided between the corresponding pixel electrodes and extending in parallel with the first source lines, and a capacitor line extension portion extended from each capacitor line at every pixel so as to extend along the capacitor line and having a portion overlapping a corresponding first source line and a portion overlapping a corresponding second source line. The manufacturing method includes: the step of detecting disconnection of a capacitor line; the step of forming a source line bypassing portion by cutting a first source line and a second source line provided along both sides of a pixel electrode of a pixel corresponding to a disconnected location of the capacitor line detected in the disconnection detecting step at a position located beyond the disconnected capacitor line and a position located beyond a capacitor line extension portion extended from the capacitor line, so that each source line bypassing portion has a portion overlapping the capacitor line and a portion overlapping the capacitor line extension portion; and the step of connecting the respective portions of the source line bypassing portions overlapping the capacitor line with the disconnected capacitor line and connecting the respective portions of the source line bypassing portions overlapping the capacitor line extension portion with the capacitor line extension portion.

According to the above-described method, in the step of forming a source line bypassing portion, the source line bypassing portions each having a portion overlapping the capacitor line and a portion overlapping the capacitor line extension portion are formed on both sides of the pixel electrode of the pixel corresponding to the disconnected location of the capacitor line detected in the disconnection detecting step. In the connecting step, the source line bypassing portions are connected to the disconnected capacitor line and the capacitor line extension portion. An auxiliary capacitor signal is thus supplied to the downstream of the disconnected location of the capacitor line through the source line bypassing portions and the capacitor line extension portion. Therefore, disconnection of the capacitor line is repaired while suppressing generation of pixel defects.

The cutting and the connection may be conducted by laser radiation.

The above-described method enables reliable cutting and connection of wirings.

The cutting may be conducted by a fourth harmonic wave of a YAG laser.

The above-described method improves reliability of breakage and separation of the first source line, the second source line, and the capacitor line by laser radiation.

The connection may be conducted by a second harmonic wave of a YAG laser.

The above-described method improves reliability of laser fusion bonding between the source line bypassing portion and the gate line, between the source line bypassing portion and the capacitor line bypassing portion, between the capacitor line bypassing portion and the first source line, between the capacitor line bypassing portion and the second source line, between the source line bypassing portion and the capacitor line, and between the source line bypassing portion and the capacitor line extension portion.

According to various preferred embodiments of the present invention, a first source line and a second source line extending in parallel with each other are provided between pixel electrodes, and a capacitor line extends in a direction crossing an extending direction of the first source line and the second source line. Therefore, disconnection can be repaired while suppressing generation of pixel defects, and manufacturing yield of an active matrix substrate and a display device including the same can be improved.

These and other features, elements, steps, advantages, and characteristics of the present invention will be apparent from the following description of preferred embodiments with reference to the accompanying drawings.

DETAILED DESCRIPTION OF THE PREFERRED EMBODIMENTS

Hereinafter, preferred embodiments of the present invention will be described in detail with reference to the accompanying drawings. It should be understood that the present invention is not limited to the preferred embodiments described below.

First Preferred Embodiment

FIGS. 1 through 5 show an active matrix substrate, a display device, and a television apparatus according to a first preferred embodiment of the present invention. Although a liquid crystal display device is shown as an example of the display device in this preferred embodiment, the present invention is also applicable to other display devices such as an organic EL (electroluminescent) display device.

Figure 4:
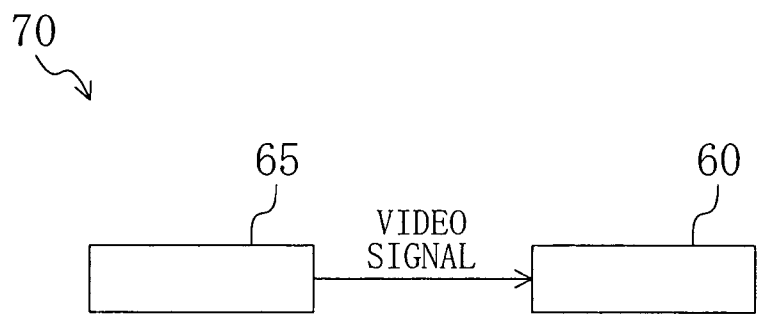
FIG. 4 is a block diagram of a television apparatus having a liquid crystal display device.

FIG. 4 is a block diagram of a television apparatus 70 of this preferred embodiment.

As shown in FIG. 4, the television apparatus 70 includes a tuner portion 65 for receiving television broadcasting and outputting a video signal and a liquid crystal display device 60 for displaying an image based on the video signal supplied from the tuner portion 65.

Figure 3:
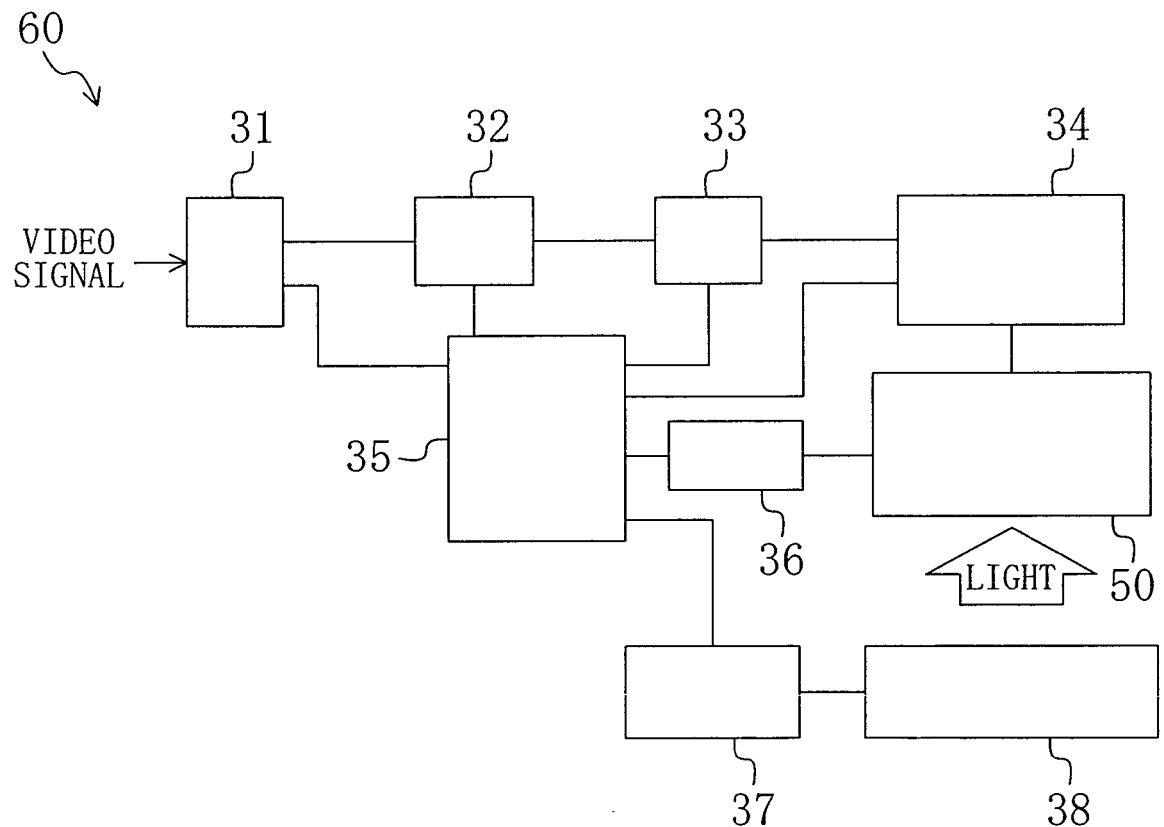
FIG. 3 is a block diagram of a liquid crystal display device having a liquid crystal display panel.

FIG. 3 is a block diagram of the liquid crystal display device 60 of this preferred embodiment.

As shown in FIG. 3, the liquid crystal display device 60 includes: a Y/C separation circuit 31 for separating a video signal supplied from the tuner portion 65 or the like into a luminance signal and a color signal; a video chroma circuit 32 for converting the luminance signal and the color signal into an analog RGB signal of light's three primary colors: R (red), G (green), and B (blue); an A-D (analog-to-digital) converter 33 for converting the analog RGB signal into a digital RGB signal; a liquid crystal controller 34 for receiving the digital RGB signal; a liquid crystal display panel 50 for receiving the digital RGB signal from the liquid crystal controller 34 at a prescribed timing and substantially displaying an image; a gradation circuit 36 for supplying a gray-scale voltage to the liquid crystal display panel 50; a backlight 38 for supplying light to the liquid crystal display panel 50; a backlight driving circuit 37 for driving the backlight 38; and a microcomputer 35 for controlling the whole system having the above-described structure.

In addition to the video signal based on television broadcasting as described above, various video signals such as a video signal captured by a camera and a video signal supplied over the Internet can be used as a video signal to be supplied to the Y/C separation circuit 31.

Figure 2:
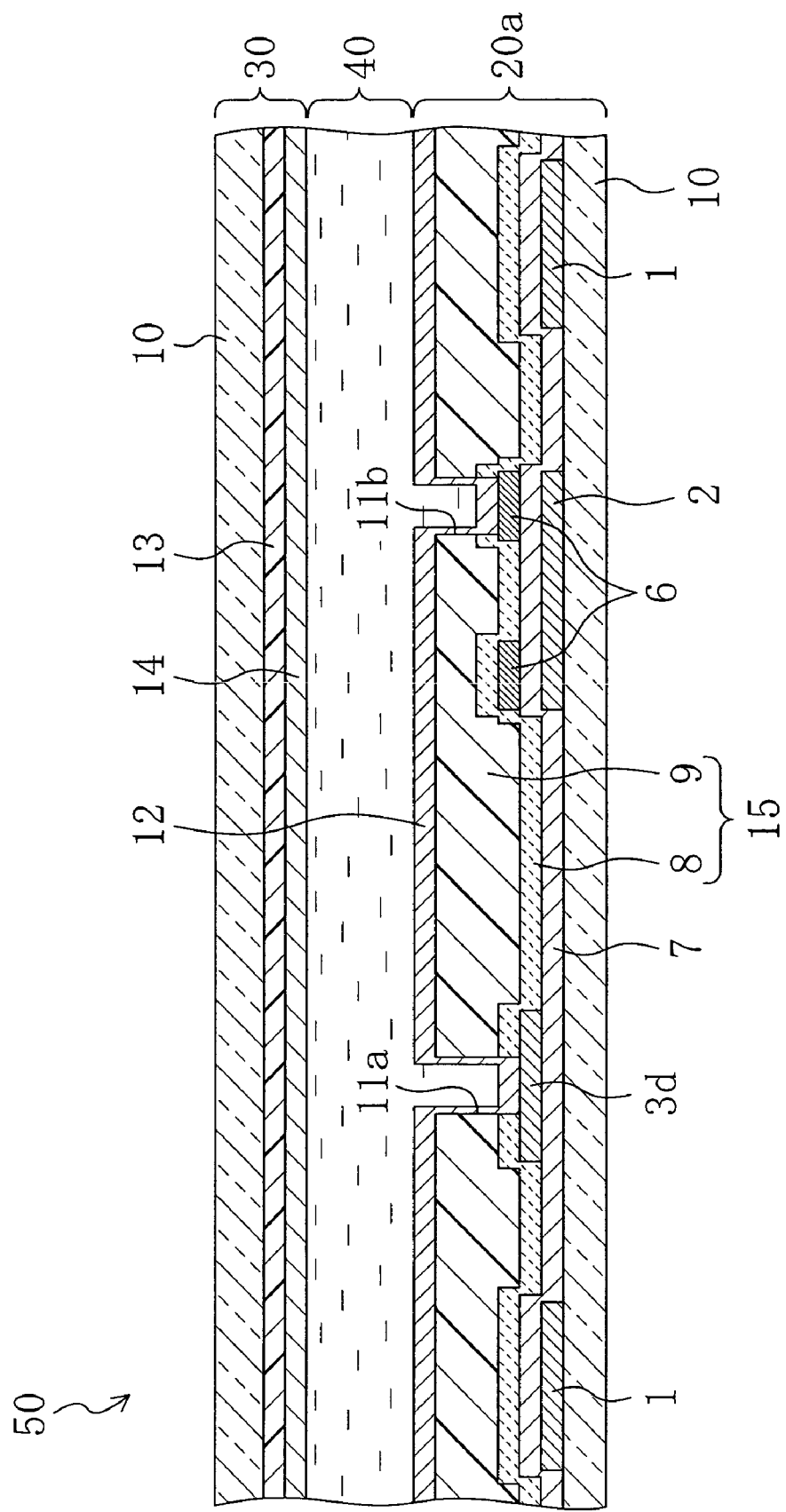
FIG. 2 is a cross-sectional view of the active matrix substrate (a liquid crystal display panel) taken along line II-II in FIG. 1.

FIG. 2 is a cross-sectional view of the liquid crystal display panel 50 of this preferred embodiment.

As shown in FIG. 2, the liquid crystal display panel 50 includes an active matrix substrate 20a and a counter substrate 30 which face each other, and a liquid crystal layer 40 interposed between the substrates 20a and 30.

Figure 1:
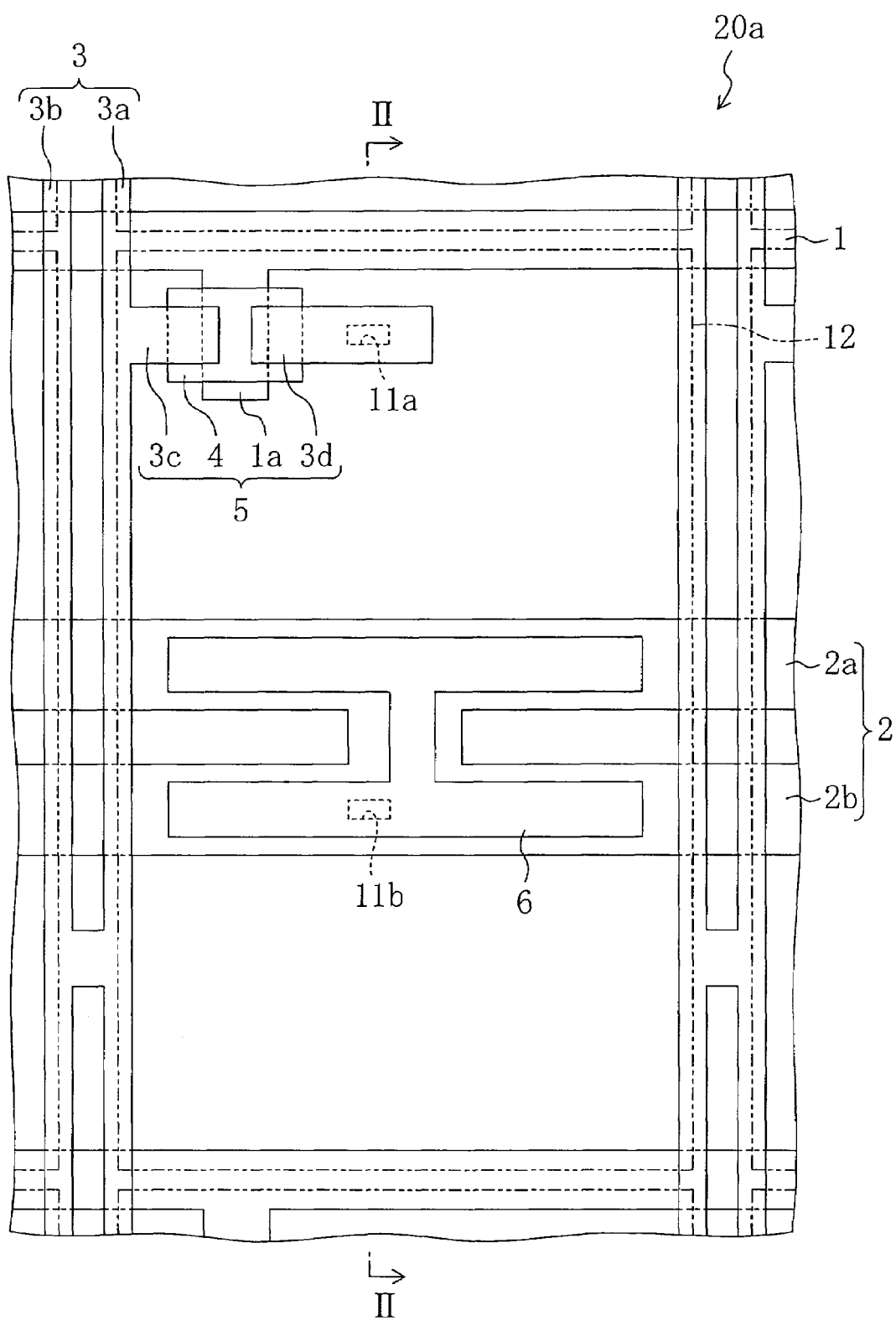
FIG. 1 is a plan view of an active matrix substrate according to a first preferred embodiment of the present invention.

FIG. 1 is a plan view of the active matrix substrate 20a of this preferred embodiment. FIG. 2 is a cross-sectional view of the liquid crystal display panel 50 taken along line II-II in FIG. 1.

As shown in FIG. 1, the active matrix substrate 20a includes a plurality of gate lines 1 extending substantially in parallel with each other, a plurality of source lines 3 extending substantially in parallel with each other in the direction perpendicular to the extending direction of the gate lines 1, and capacitor lines 2 each extending between the corresponding gate lines 1. A TFT 5 is provided at each intersection of the gate lines 1 and the source lines 3. A pixel electrode 12 forming a pixel is provided in a display region surrounded by a pair of gate lines 1 and a pair of source lines 3 corresponding to each TFT 5.

Each source line 3 is formed by a first source line 3a connected to a corresponding TFT 5 and a second source line 3b adjacent to the first source line 3a and connected to the first source line 3a in every pixel.

Each capacitor line 2 is formed by a first capacitor line 2a and a second capacitor line 2b. The first capacitor line 2a and the second capacitor line 2b extend in parallel with each other and are connected to each other in every pixel.

As shown in FIGS. 1 and 2, the TFT 5 includes: a gate electrode 1a protruding laterally from the gate line 1; a semiconductor layer 4 formed on the gate electrode 1a with a gate insulating film 7 interposed therebetween and formed by an intrinsic amorphous silicon layer and an n+amorphous silicon layer; a source electrode 3c formed over the semiconductor layer 4 and protruding laterally from the first source line 3a; and a drain electrode 3d facing the source electrode 3c over the semiconductor layer 4.

A capacitor electrode 6 is formed in every pixel in a layer above the gate insulating film 7 so as to overlap the corresponding capacitor line 2. An interlayer insulating film 15 is formed so as to cover the TFTs 5 and the capacitor electrodes 6. The interlayer insulating film 15 is formed by an upper layer and a lower layer, that is, a first interlayer insulating film 8 and a second interlayer insulating film 9. Pixel electrodes 12 are formed in a layer above the interlayer insulating film 15. Each pixel electrode 12 is connected to a corresponding drain electrode 3d and a corresponding capacitor electrode 6 through contact holes 11a and 11b, respectively. An alignment film (not shown) is formed in a layer above the pixel electrodes 12.

The gate insulating film 7 (a dielectric film) is interposed between the capacitor line 2 and the capacitor electrode 6. An auxiliary capacitor is formed by the capacitor line 2, the gate insulating film 7, and the capacitor electrode 6.

The counter substrate 30 has a multi-layered structure. In other words, a color filter layer 13, a common electrode 14, and an alignment film (not shown) are sequentially formed on the insulating substrate 10 as the counter substrate 30.

The color filter layer 13 has a colored layer of red, green, or blue in every pixel of the active matrix substrate 20a. Each picture element is formed by three pixels of red, green, and blue.

The liquid crystal layer 40 includes nematic liquid crystal molecules (a liquid crystal material) having electrooptical characteristics.

In the liquid crystal display panel 50 having the above-described structure, a pixel is formed for every pixel electrode 12. In each pixel, when the TFT 5 is turned on in response to a scanning signal received from the gate line 1 through the gate electrode 1a, a data signal is applied from the source line 3 and prescribed charges are written to the pixel electrode 12 through the source electrode 3c and the drain electrode 3d. As a result, a potential difference is generated between the pixel electrode 12 and the common electrode 14, whereby a prescribed voltage is applied to a liquid crystal capacitor formed by the liquid crystal layer 40 and the auxiliary capacitor. An orientation state of the liquid crystal molecules changes according to the applied voltage level. In the liquid crystal display panel 50, an image is displayed by adjusting a transmittance of incident light from the outside (the backlight 38) by using this property of the liquid crystal molecules.

Hereinafter, an example of a manufacturing method of the liquid crystal display panel 50 of the liquid crystal display device 60 according to the first preferred embodiment of the present invention will be described.

The liquid crystal display panel 50 is preferably manufactured by the following three steps as described below: the step of fabricating an active matrix substrate; the step of fabricating a counter substrate; and the step of fabricating a liquid crystal display panel. An inspection step is conducted after at least one of the step of fabricating an active matrix substrate and the step of fabricating a liquid crystal display panel. In the case where disconnection is detected in the inspection step, the step of repairing the disconnection is added after the inspection step.

The step of fabricating an active matrix substrate will now be described.

First, a metal film of titanium, chromium, aluminum, molybdenum, tantalum, tungsten, copper, or the like, an alloy film of any combination of these metals, or a laminated film of any combination of these metals (with a thickness of 1,000 Å to 3,000 Å) is formed on the whole surface of an insulating substrate 10 such as a glass substrate by a sputtering method. The resultant substrate is then patterned by photolithography technology (Photo Engraving Process; hereinafter, referred to as "PEP technology") to form gate lines 1, gate electrodes 1a, and capacitor lines 2.

An inorganic insulating film of silicon nitride, silicon oxide, or the like (with a thickness of about 3,000 Å to about 5,000 Å) is then formed by a CVD (Chemical Vapor Deposition) method on the whole substrate having the gate lines 1 and the like formed thereon. A gate insulating film 7 is thus formed.

Thereafter, an intrinsic amorphous silicon film (with a thickness of 1,000 Å to 3,000 Å) and a phosphorus-doped n+ amorphous silicon film (with a thickness of 400 Å to 700 Å) are sequentially formed by a CVD method on the whole substrate having the gate insulating film 7 thereon. The films thus formed are then patterned into an island shape over the gate electrode 1a by PEP technology to form a silicon lamination of the intrinsic amorphous silicon film and the n+ amorphous silicon layer.

Thereafter, a metal film of titanium, chromium, aluminum, molybdenum, tantalum, tungsten, copper, or the like, an alloy film of any combination of these metals, or a laminated film of any combination of these metals (with a thickness of 1,000 Å to 3,000 Å) is formed by a sputtering method over the whole substrate having the silicon lamination thereon. The resultant substrate is then patterned by PEP technology to form first source lines 3a, second source lines 3b, source electrodes 3c, drain electrodes 3d, and capacitor electrodes 6.

Thereafter, the n+ amorphous silicon layer of the silicon lamination is etched by using the source electrodes 3c and the drain electrodes 3d as a mask in order to form a semiconductor layer 4 having channel portions.

The semiconductor layer 4 may be formed by an amorphous silicon film as described above. Alternatively, a polysilicon film may be used or an amorphous silicon film and a polysilicon film may be laser-annealed for an improved crystalline property. This increases the electron mobility in the semiconductor layer and thus improves characteristics of the TFT 5.

An inorganic insulating film of silicon nitride, silicon oxide, or the like (with a thickness of 2,000 Å to 5,000 Å) is then formed by a CVD method on the whole substrate having the source lines 3 (the first source lines 3a and the second source lines 3b) and the like thereon. A first interlayer insulating film 8 is thus formed.

A photosensitive acrylic resin (with a thickness of 2 μm to 4 μm) is then formed by a die coating method on the whole substrate having the first interlayer insulating film 8 thereon. A second interlayer insulating film 9 is thus formed.

The first interlayer insulating film 8 and the second interlayer insulating film 9 form an interlayer insulating film 15. A portion of the interlayer insulating film 15 which corresponds to the drain electrodes 3d and the capacitor electrodes 6 is removed by an etching method to form contact holes 11a and 11b.

A transparent conductive film of ITO (Indium Tin Oxide), IZO (Indium Zinc Oxide), zinc oxide, tin oxide, or the like (with a thickness of 1,000 Å to 2,000 Å) is then formed by a sputtering method on the whole substrate having the interlayer insulating film 15 thereon. The resultant substrate is then patterned by PEP technology to form pixel electrodes 12.

Finally, a polyimide resin is printed with a thickness of 500 Å to 1,000 Å on the whole substrate having the pixel electrodes 12 thereon. The resultant substrate is then baked and rubbed in one direction with a rotating cloth to form an alignment film.

The active matrix substrate 20a can thus be fabricated (manufactured).

Hereinafter, the step of fabricating a counter substrate will be described.

First, a Cr (chromium) thin film or a resin containing a black pigment is formed on an insulating substrate 10 such as a glass substrate. The film thus formed is then patterned by PEP technology to form a black matrix.

A colored layer of red, green, or blue (with a thickness of about 2 μm) is then patterned in each space of the black matrix by a pigment dispersion method or the like in order to form a color filter layer 13.

A transparent conductive film of ITO, IZO, zinc oxide, tin oxide, or the like (with a thickness of about 1,000 Å) is then formed on the whole substrate having the color filter layer 13 thereon to form a common electrode 14.

Finally, a polyimide resin is printed with a thickness of 500 Å to 1,000 Å on the whole substrate having the common electrode 14 thereon. The resultant substrate is then baked and rubbed in one direction with a rotating cloth to form an alignment film.

A counter substrate is thus fabricated (manufactured).

Hereinafter, the step of fabricating a liquid crystal display panel will be described.

First, a sealing material such as a thermosetting epoxy resin is applied to one of the active matrix substrate 20a and the counter substrate 30 fabricated as described above by a screen printing method. The sealing material is applied with a frame pattern except for a portion corresponding to a liquid crystal inlet port. Spherical spacers of plastic or silica are sprayed onto the other substrate. The spherical spacers have a diameter equal to the thickness of the liquid crystal layer 40.

Thereafter, the active matrix substrate 20a and the counter substrate 30 are bonded together and the sealing material is cured. An empty liquid crystal display panel is thus fabricated.

Finally, a liquid crystal material is introduced into the empty liquid crystal display panel by a dipping method. A UV (ultraviolet) curable resin is then applied to the liquid crystal inlet port and the liquid crystal material is then sealed by UV radiation. A liquid crystal layer 40 is thus formed.

The liquid crystal display panel 50 is thus fabricated (manufactured).

Hereinafter, the inspection step and the disconnection repairing step will be described.

First, description will be given about the case where the inspection step (the disconnection detecting step) is conducted after the step of fabricating an active matrix substrate.

In the disconnection detecting step, disconnection (a disconnected location) is detected by conducting appearance inspection and electro-optical inspection to the active matrix substrate 20a fabricated in the step of fabricating an active matrix substrate. The appearance inspection herein refers to the process of optically inspecting wiring patterns by a CCD (Charge Coupled Device) camera or the like. The electro-optical inspection refers to the process of placing a modulator (an electro-optical element) so that the modulator faces the active matrix substrate, applying a voltage between the active matrix substrate and the modulator and allowing light to be incident, and electro-optically inspecting wiring patterns by capturing a change of luminance of the incident light by a CCD camera.

Thereafter, detected disconnection in the active matrix substrate 20a is repaired. In this preferred embodiment, it is assumed that a gate line 1 of the active matrix substrate 20a has disconnection, and a method for repairing the disconnection will be described with reference to FIG. 5. The disconnection of the gate line 1 is repaired by the following three steps, as described below: the step of forming a source line bypassing portion; the step of forming a capacitor line bypassing portion; and the connecting step.

Figure 5:
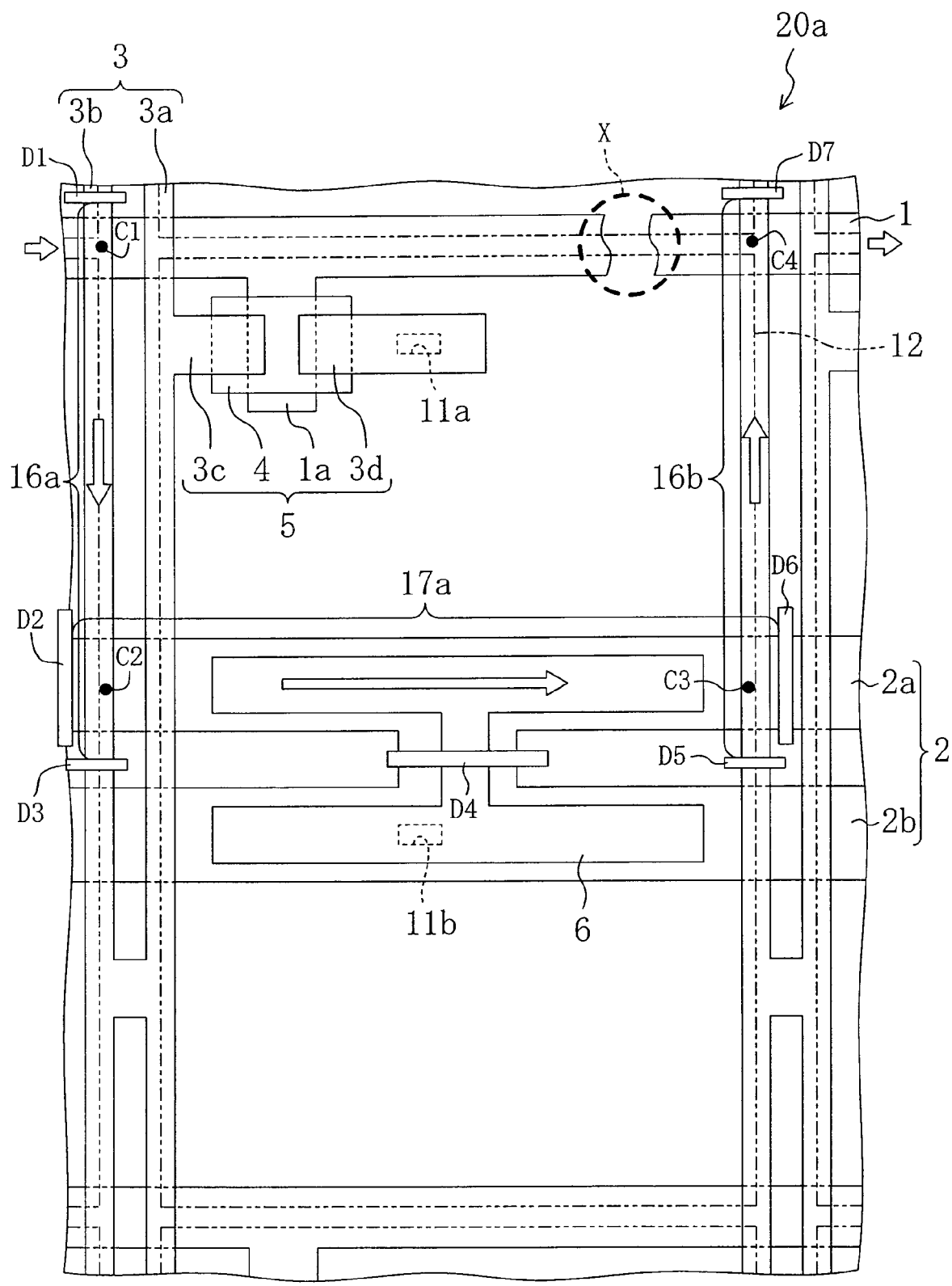
FIG. 5 is a plan view of the active matrix substrate of the first preferred embodiment after gate line disconnection is repaired.

First, in the step of forming a source line bypassing portion, laser beams are emitted to locations D1, D3, D5, and D7 in FIG. 5. As a result, the second source lines 3b provided along both sides of a pixel electrode 12 of a pixel corresponding to a disconnected location X of a gate line 1 detected in the disconnection detecting step are cut at the positions (D3 and D5) located beyond a first capacitor line 2a extending across the pixel electrode 12 and the positions (D1 and D7) located beyond the disconnected gate line 1. Each of source line bypassing portions 16a and 16b thus formed has a portion overlapping the first capacitor line 2a and a portion overlapping the gate line 1.

In the step of forming a capacitor line bypassing portion, laser beams are emitted to locations D2, D4, and D6 in FIG. 5. As a result, the first capacitor line 2a extending across the pixel electrode 12 of the pixel corresponding to the disconnected location X of the gate line 1 detected in the disconnection detecting step is cut at the positions (D2 and D6) located beyond the respective second source lines 3b provided along both sides of the pixel electrode 12 of the pixel corresponding to the disconnected location X. This first capacitor line 2a is also cut at the joint portion D4 of the first capacitor line 2a and the second capacitor line 2b. A capacitor line bypassing portion 17a thus formed has a portion overlapping one of the second source lines 3b and a portion overlapping the other second source line 3b.

For example, a fourth harmonic wave (a wavelength of 266 nm) of a YAG laser is used to cut the second source lines 3b and the first capacitor line 2a as described above.

In the connection step, laser beams are emitted to locations C1 through C4 in FIG. 5 in order to connect the respective portions (C1 and C4) of the source line bypassing portions 16a and 16b overlapping the gate line 1 with the disconnected gate line 1 and to connect the respective portions (C2 and C3) of the source line bypassing portions 16a and 16b overlapping the first capacitor line 2a with the capacitor line bypassing portion 17a. For example, a second harmonic wave (a wavelength of 532 nm) of a YAG laser is used for this connection of the lines.

By the above-described disconnection repairing step, a scanning signal can be supplied to the downstream of the disconnected location X of the gate line 1 through the source line bypassing portion 16a, the capacitor line bypassing portion 17a, and the source line bypassing portion 16b as shown by arrows in FIG. 5.

Hereinafter, description will be given about the case where the inspection step (the disconnection detecting step) is conducted after the step of fabricating a liquid crystal display panel.

In this disconnection detecting step, disconnection (a disconnected location) is detected by conducting dynamic operation inspection to the liquid crystal display panel 50 fabricated in the step of fabricating a liquid crystal display panel. More specifically, a gate inspection signal having a bias voltage of −10 V, a period of 16.7 milliseconds, and a pulse voltage of +15 V with a pulse width of 50 microseconds, for example, is applied to each gate line 1 to turn on all the TFTs 5. Moreover, a source inspection signal having a potential of ±2 V and having its polarity inverted every 16.7 milliseconds is applied to each source line 3 to write charges corresponding to ±2 V to the pixel electrode 12 through the source electrode 3c and the drain electrode 3d of each TFT 5. At the same time, a common electrode inspection signal having a DC (direct-current) potential of −1 V is applied to the common electrode 14. At this time, a voltage is applied to the liquid crystal capacitor formed between the pixel electrode 12 and the common electrode 14 and a pixel corresponding to that pixel electrode 12 is turned on. As a result, display changes from white display to black display in a normally white mode (the mode in which white display is provided during no voltage application). Prescribed charges cannot be written to a pixel electrode 12 corresponding to a pixel located along a disconnected line, and that pixel is not turned on (a bright spot). The disconnected location of the line is thus detected.

Thereafter, the detected disconnection is repaired in the liquid crystal display panel 50. A repairing method is substantially the same as the repairing method described above for the active matrix substrate 20a. Therefore, detailed description thereof will be omitted. It should be noted that in the repairing method for the active matrix substrate 20a, laser beams can be emitted from both front and back sides of the active matrix substrate 20a. In the repairing method for the liquid crystal display panel 50, however, laser beams are emitted from the side of the active matrix substrate 20a.

As has been described above, when the gate line 1 has disconnection in the active matrix substrate 20a of this preferred embodiment, the source line bypassing portions 16a and 16b and the capacitor line bypassing portion 17a are formed, and the disconnected gate line 1, the source line bypassing portions 16a and 16b, and the capacitor line bypassing portion 17a are connected to each other. A scanning signal is thus supplied to the downstream of the disconnected location X of the gate line 1 through the source line bypassing portion 16a, the capacitor line bypassing portion 17a, and the source line bypassing portion 16b. Unlike a conventional method, it is not necessary to use a pixel electrode as a bypass for repairing disconnection. Therefore, disconnection can be repaired while suppressing generation of pixel defects.

In the active matrix substrate 20a, the gate lines 1 and the capacitor lines 2 are formed independently. Therefore, load on each gate line 1 is reduced and signal delay on each gate line 1 can be improved.

In the active matrix substrate 20a, each capacitor line 2 is formed by the first capacitor line 2a and the second capacitor line 2b. In order to repair disconnection of the gate line 1, for example, a portion of the first capacitor line 2a is cut to form a capacitor line bypassing portion 17a. However, since the second capacitor line 2b is not cut and functions as an auxiliary capacitor, disconnection can be repaired while suppressing degradation in display quality as much as possible.

Moreover, the first capacitor line 2a and the second capacitor line 2b are connected to each other in the active matrix substrate 20a. Therefore, a connection terminal to an external driving circuit can be shared and it is not necessary to provide an additional external driving circuit.

In the active matrix substrate 20a, the second interlayer insulating film 9 on the order of several microns is formed from a photosensitive resin or the like between the layer in which the pixel electrodes 12 are formed and the layer in which the first source lines 3a and the second source lines 3b are formed. Therefore, the first source lines 3a and the second source lines 3b can be formed so as to overlap the corresponding pixel electrodes 12. This structure increases an effective pixel area, enabling improvement in an aperture ratio.

In the active matrix substrate 20a, the interlayer insulating film 15 is formed between each TFT 5 and each capacitor electrode 6 and each pixel electrode 12, and the drain electrode 3d of each TFT 5 and each capacitor electrode 6 are connected to a corresponding pixel electrode 12 through the corresponding contact holes 11a and 11b formed in the interlayer insulating film 15, respectively. Therefore, even when the capacitor line 2 and the capacitor electrode 6 are short-circuited and an auxiliary capacitor formed between the capacitor line 2 and the capacitor electrode 6 is cut and separated, that is, even when an auxiliary capacitor having the capacitor electrode 6 connected to the pixel electrode 12 through the contact hole 11b is cut and separated, a data signal from the first source line 3a is supplied to the pixel electrode 12 through the contact hole 11a. Therefore, pixel defects resulting from a short-circuited auxiliary capacitor can be repaired.

Second Preferred Embodiment

Figure 6:
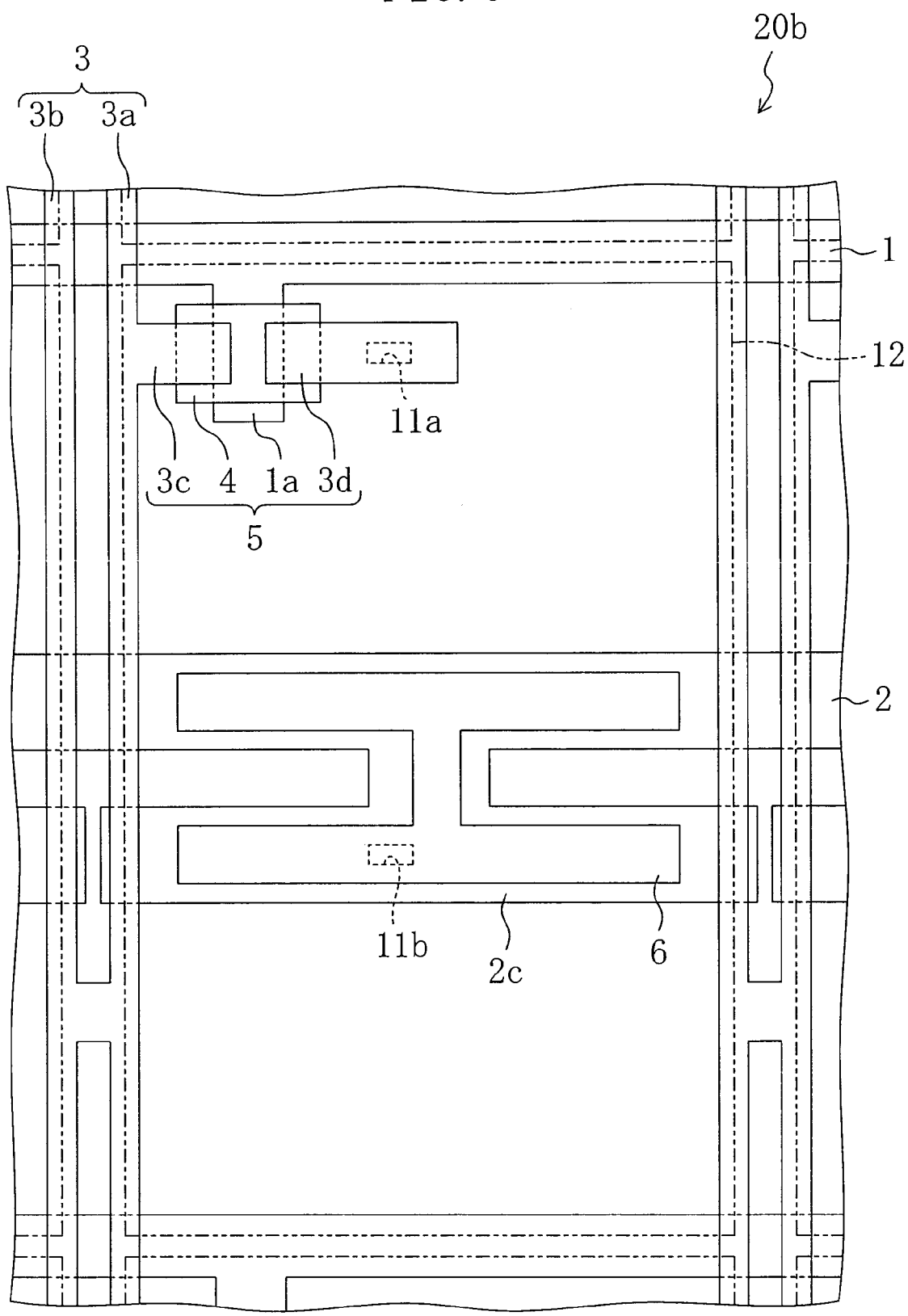
FIG. 6 is a plan view of an active matrix substrate according to a second preferred embodiment of the present invention.
Figure 7:
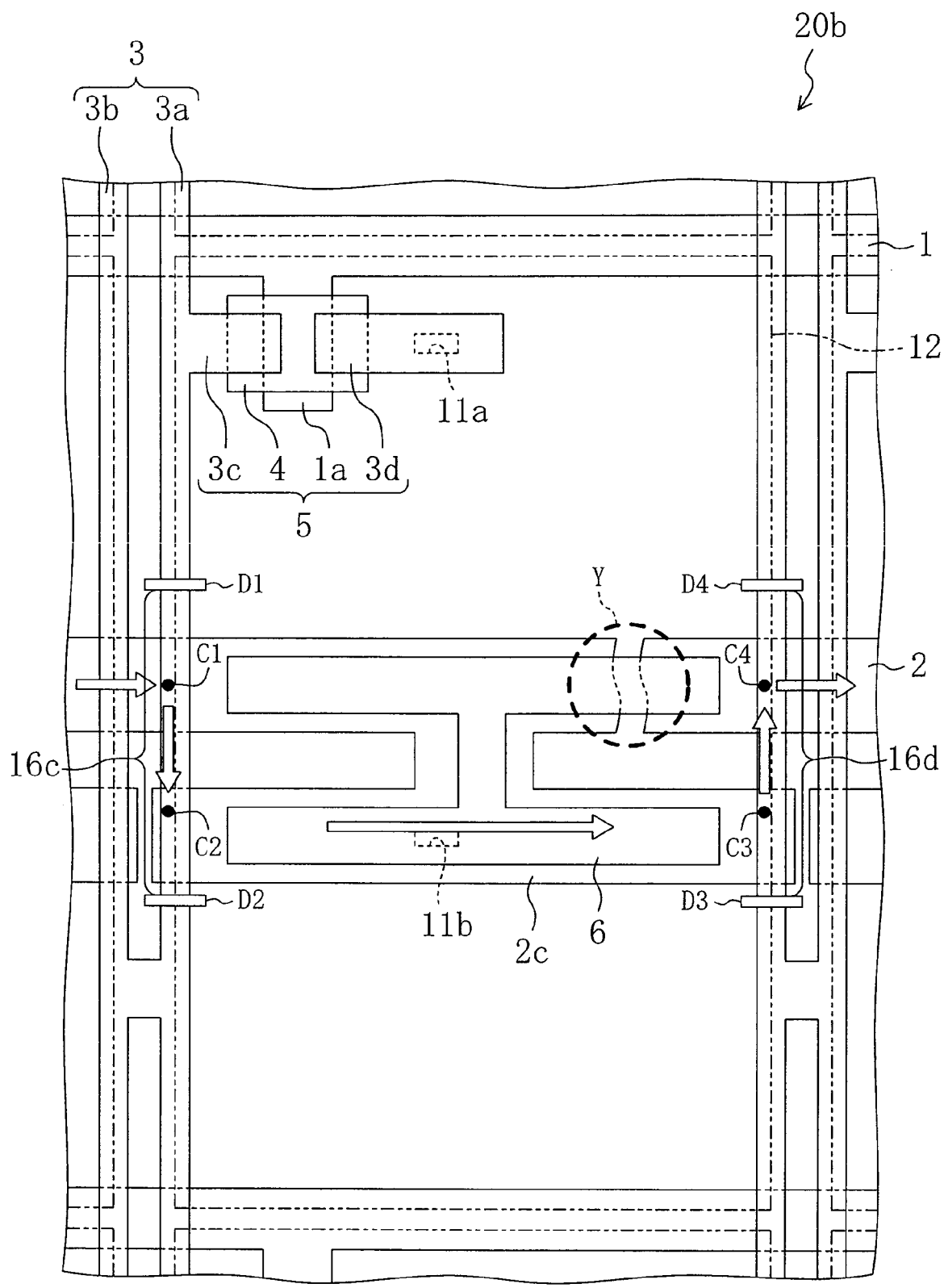
FIG. 7 is a plan view of the active matrix substrate of the second preferred embodiment after capacitor line disconnection is repaired.

FIGS. 6 and 7 are plan views of an active matrix substrate 20b according to this preferred embodiment. In the following preferred embodiments, the same elements as those of FIGS. 1 through 5 are denoted with the same reference numerals and characters and detailed description thereof will be omitted.

In this active matrix substrate 20b, each capacitor line 2 is extended at every pixel so as to have a capacitor line extension portion 2c extending along the capacitor line 2. The capacitor line extension portion 2c has a portion overlapping a corresponding first source line 3a and a portion overlapping a corresponding second source line 3b. Since the structure and effects of this active matrix substrate 20b are otherwise the same as the structure and effects of the active matrix substrate 20a described in the first preferred embodiment, detailed description thereof will be omitted.

Hereinafter, a method for repairing disconnection in the active matrix substrate 20b having the above structure will be described. In this preferred embodiment, a method for repairing disconnection of a capacitor line 2 of the active matrix substrate 20b will be described with reference to FIG. 7. The disconnection of the capacitor line 2 is repaired by the step of forming a source line bypassing portion and the connecting step, as described below.

First, in the step of forming a source line bypassing portion, laser beams are emitted to locations D1 through D4 in FIG. 7. As a result, the first source line 3a and the second source lines 3b provided along both sides of a pixel electrode 12 of a pixel corresponding to a disconnected location Y of a capacitor line 2 detected in the disconnection detecting step are respectively cut at the positions (D1 and D4) located beyond the disconnected capacitor line 2 and the positions (D1 and D3) located beyond a corresponding capacitor line extension portion 2c extended from the capacitor line 2. Each of source line bypassing portions 16c and 16d thus formed has a portion overlapping the capacitor line 2 and a portion overlapping the capacitor line extension portion 2c.

In the connecting step, laser beams are emitted to locations C1 through C4 in FIG. 7 in order to connect the respective portions (C1 and C4) of the source line bypassing portions 16c and 16d overlapping the capacitor line 2 with the disconnected capacitor line 2 and to connect the respective portions (C2 and C3) of the source line bypassing portions 16c and 16d overlapping the capacitor line extension portion 2c with the capacitor line extension portion 2c.

By the above-described disconnection repairing step, an auxiliary capacitor signal can be supplied to the downstream of the disconnected location Y of the capacitor line 2 through the source line bypassing portion 16c, the capacitor line extension portion 2c, and the source line bypassing portion 16d as shown by arrows in FIG. 7.

As has been described above, in the active matrix substrate 20b of this preferred embodiment, each capacitor line 2 is extended at every pixel so as to have a capacitor line extension portion 2c. Therefore, when a capacitor line 2 has disconnection, the source line bypassing portions 16c and 16d are formed, and the disconnected capacitor line 2, the source line bypassing portions 16c and 16d, and the capacitor line extension portion 2c are connected to each other. An auxiliary capacitor signal can thus be supplied to the downstream of the disconnected location Y of the capacitor line 2 through the source line bypassing portions 16c and 16d and the capacitor line extension portion 2c. Therefore, disconnection can be repaired while suppressing generation of pixel defects.

Third Preferred Embodiment

Figure 8:
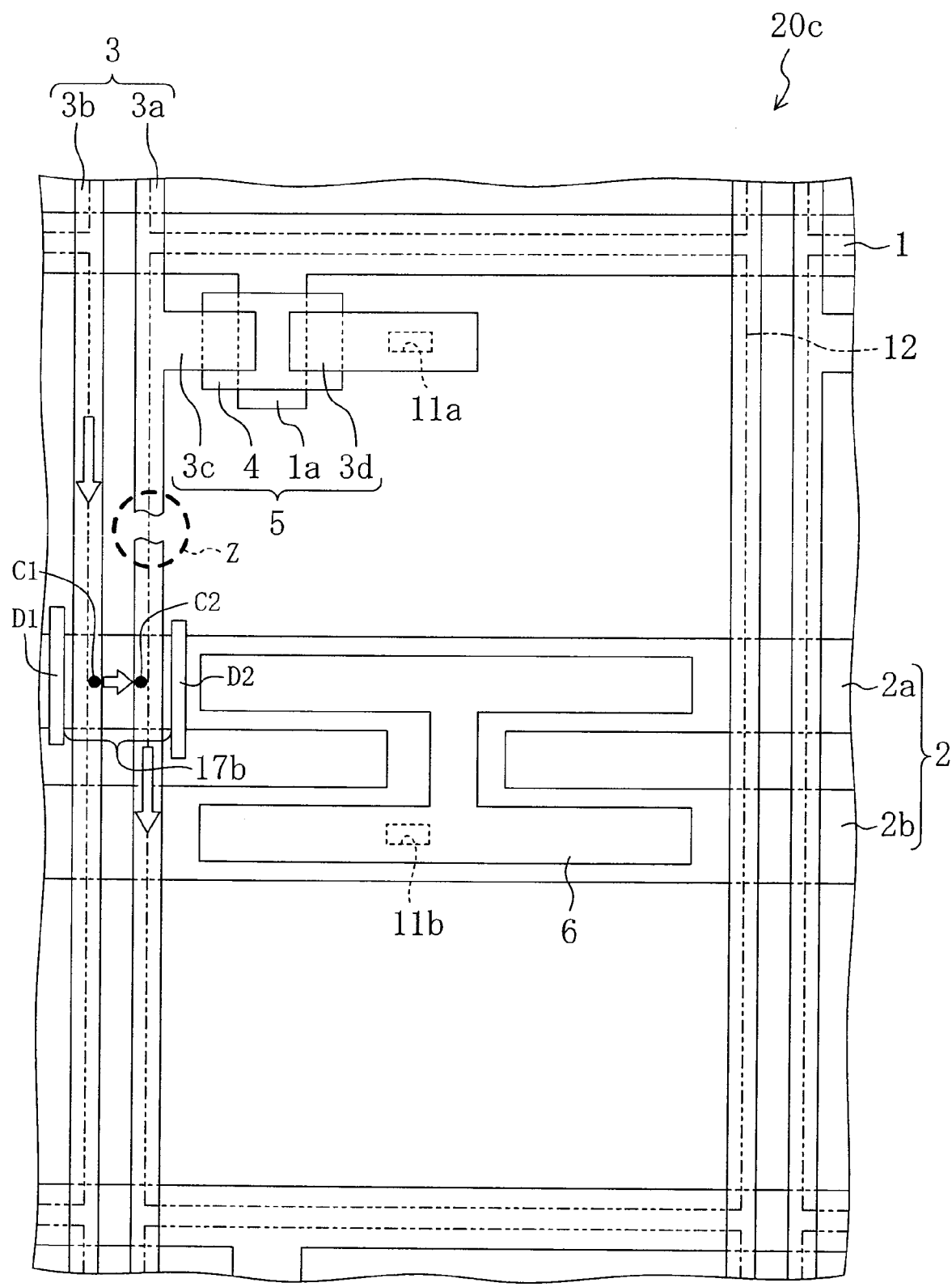
FIG. 8 is a plan view of an active matrix substrate of a third preferred embodiment after source line disconnection is repaired.

FIG. 8 is a plan view of an active matrix substrate 20c of this preferred embodiment.

The structure of this active matrix substrate 20c is substantially the same as that of the active matrix substrate 20a described in the first preferred embodiment. In this active matrix substrate 20c, a source line 3 (a first source line 3a) is shown to have disconnection instead of a gate line 1.

Hereinafter, a method for repairing disconnection of a source line in the active matrix substrate 20c having the above-described structure will be described with reference to FIG. 8. Disconnection of a first source line 3a is repaired by the step of forming a capacitor line bypassing portion and the connecting step, as described below.

First, in the step of forming a capacitor line bypassing portion, laser beams are emitted to locations D1 and D2 in FIG. 8. As a result, a first capacitor line 2a extending across a pixel electrode 12 of a pixel corresponding to a disconnected location Z of the first source line 3a detected in the disconnection detecting step is cut at the positions (D1 and D2) located outside the disconnected first source line 3a and a second source line 3b adjacent to the first source line 3a. A capacitor line bypassing portion 17b thus formed has a portion overlapping the first source line 3a and a portion overlapping the second source line 3b.

In the connecting step, laser beams are emitted to locations C1 and C2 in FIG. 8 in order to connect the portion (C2) of the capacitor line bypassing portion 17b overlapping the first source line 3a with the disconnected first source line 3a and to connect the portion (C1) of the capacitor line bypassing portion 17b overlapping the second source line 3b with the second source line 3b.

By the above disconnection repairing step, a data signal can be supplied to the downstream of the disconnected location Z of the first source line 3a through the second source line 3b and the capacitor line bypassing portion 17b as shown by arrows in FIG. 8.

As has been described above, when a source line 3, that is, a first source line 3a connected to a TFT 5, has disconnection, a capacitor line bypassing portion 17b is formed and the first source line 3a, the capacitor line bypassing portion 17b, and the second source line 3b are connected to each other. A data signal can thus be supplied to the downstream of the disconnected location Z of the first source line 3a through the second source line 3b and the capacitor line bypassing portion 17b.

Fourth Preferred Embodiment

Figure 9:
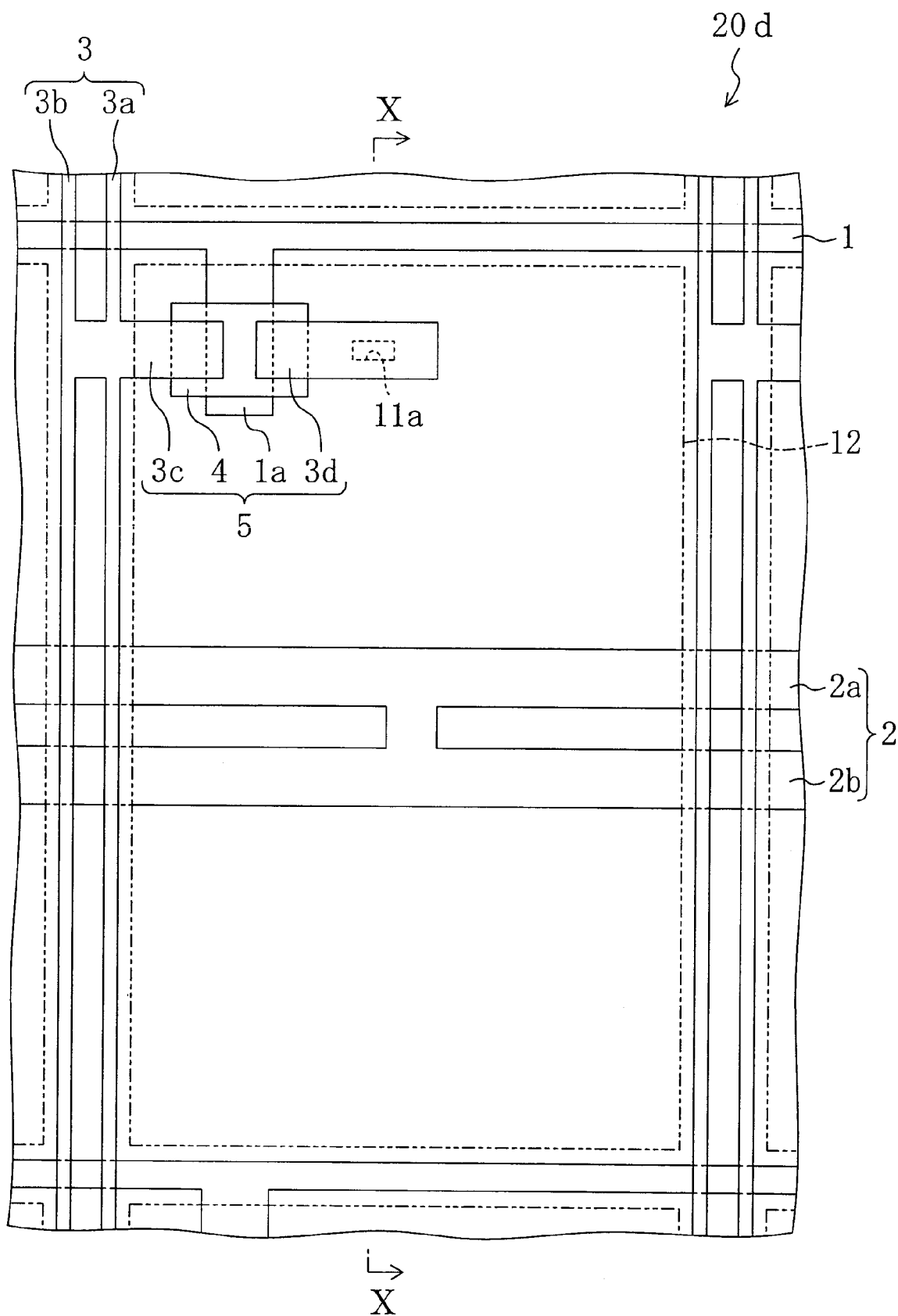
FIG. 9 is a plan view of an active matrix substrate according to a fourth embodiment of the present invention.
Figure 10:
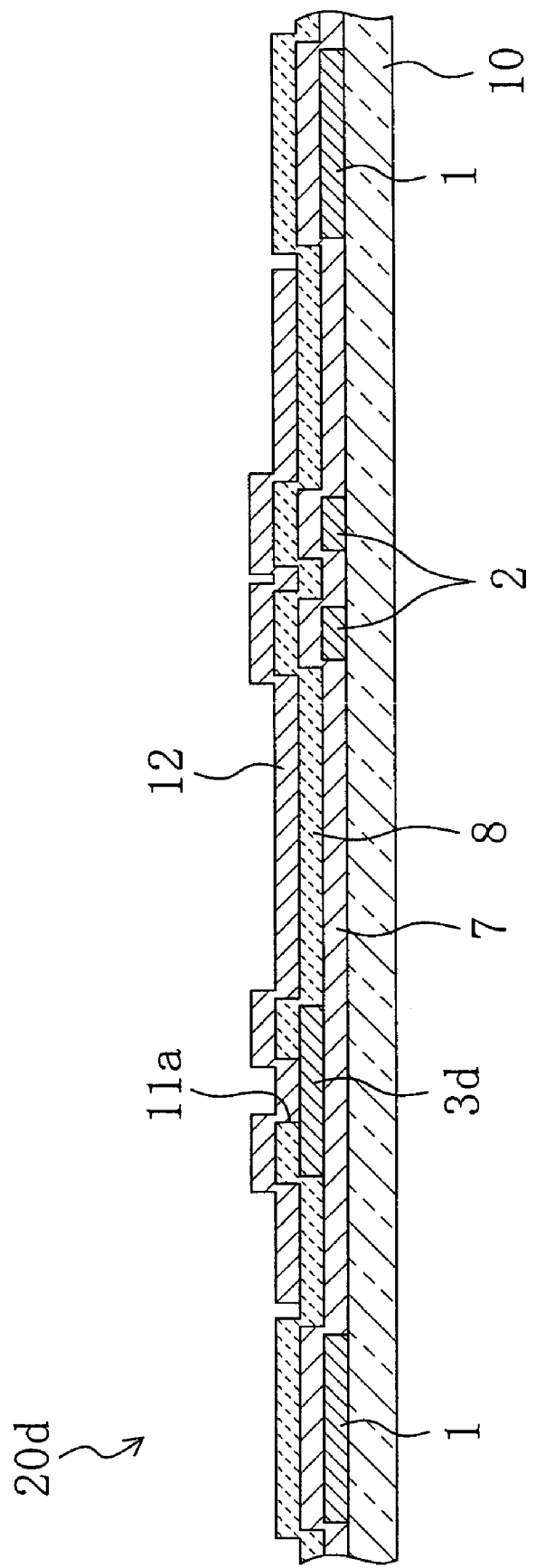
FIG. 10 is a cross-sectional view of the active matrix substrate taken along line X-X in FIG. 9.

FIG. 9 is a plan view of an active matrix substrate 20d of this preferred embodiment and FIG. 10 is a cross-sectional view of the active matrix substrate 20d taken along line X-X in FIG. 9.

As can be seen from the comparison between FIGS. 2 and 10, this active matrix substrate 20d does not have the capacitor electrodes 6, the second interlayer insulating film 9, and the contact holes 11b formed in the active matrix substrate 20a described in the first preferred embodiment. Therefore, an auxiliary capacitor is formed by a capacitor line 2, a pixel electrode 12, and a gate insulating film 7 and a first interlayer insulating film 8 interposed between the capacitor line 2 and the pixel electrode 12.

In this active matrix substrate 20d, it is not necessary to form the second interlayer insulating film 9 that is formed in the active matrix substrate 20a of the first preferred embodiment by a die coating method or the like. Therefore, the manufacturing process of the active matrix substrate can be simplified. Since the active matrix substrate 20d does not have the second interlayer insulating film 9, an auxiliary capacitor can be formed by using the gate insulating film 7 and the first interlayer insulating film 8 between the pixel electrode 12 and the capacitor line 2 as a dielectric. Accordingly, it is easier to assure an auxiliary capacitor of a desired capacity. As a result, the aperture ratio can be improved by, for example, reducing the width of the capacitor line 2.

Fifth Preferred Embodiment

Figure 11:
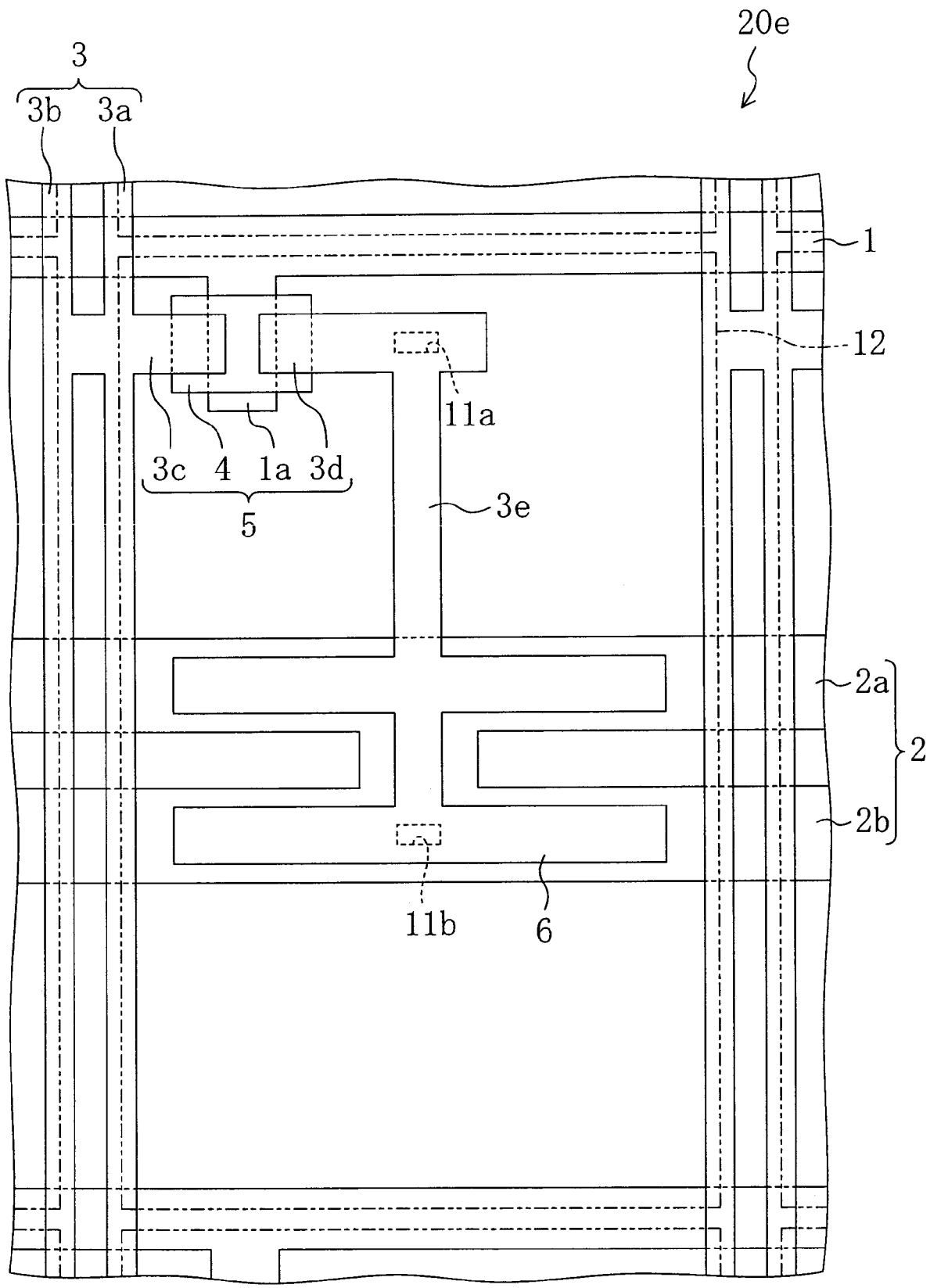
FIG. 11 is a plan view of an active matrix substrate according to a fifth preferred embodiment of the present invention.

FIG. 11 shows an active matrix substrate 20e of this preferred embodiment.

As shown in FIG. 11, in this active matrix substrate 20e, each drain electrode 3d is connected to a corresponding capacitor electrode 6 thorough an extended drain electrode 3e. Since the structure and effects of the active matrix substrate 20e are otherwise the same as the structure and effects of the active matrix substrate 20a described above in the first preferred embodiment, description thereof will be omitted.

In this active matrix substrate 20e, each drain electrode 3d is extended and connected to a corresponding capacitor electrode 6. Therefore, even when a drain electrode 3d and a corresponding pixel electrode 12 are electrically disconnected from each other due to a defective contact hole 11a formed in the interlayer insulating film 15 on the drain electrode 3d, a data signal can be supplied to the pixel electrode 12 through the extended portion (the extended drain electrode 3e) of the drain electrode 3d.

Moreover, even when the extended portion (the extended drain electrode 3e) of the drain electrode 3d has disconnection, a data signal can be supplied to the capacitor electrode 6 through the contact hole 11a formed in the interlayer insulating film 15 on the drain electrode 3d and the pixel electrode 12.

Sixth Preferred Embodiment

Figure 12:
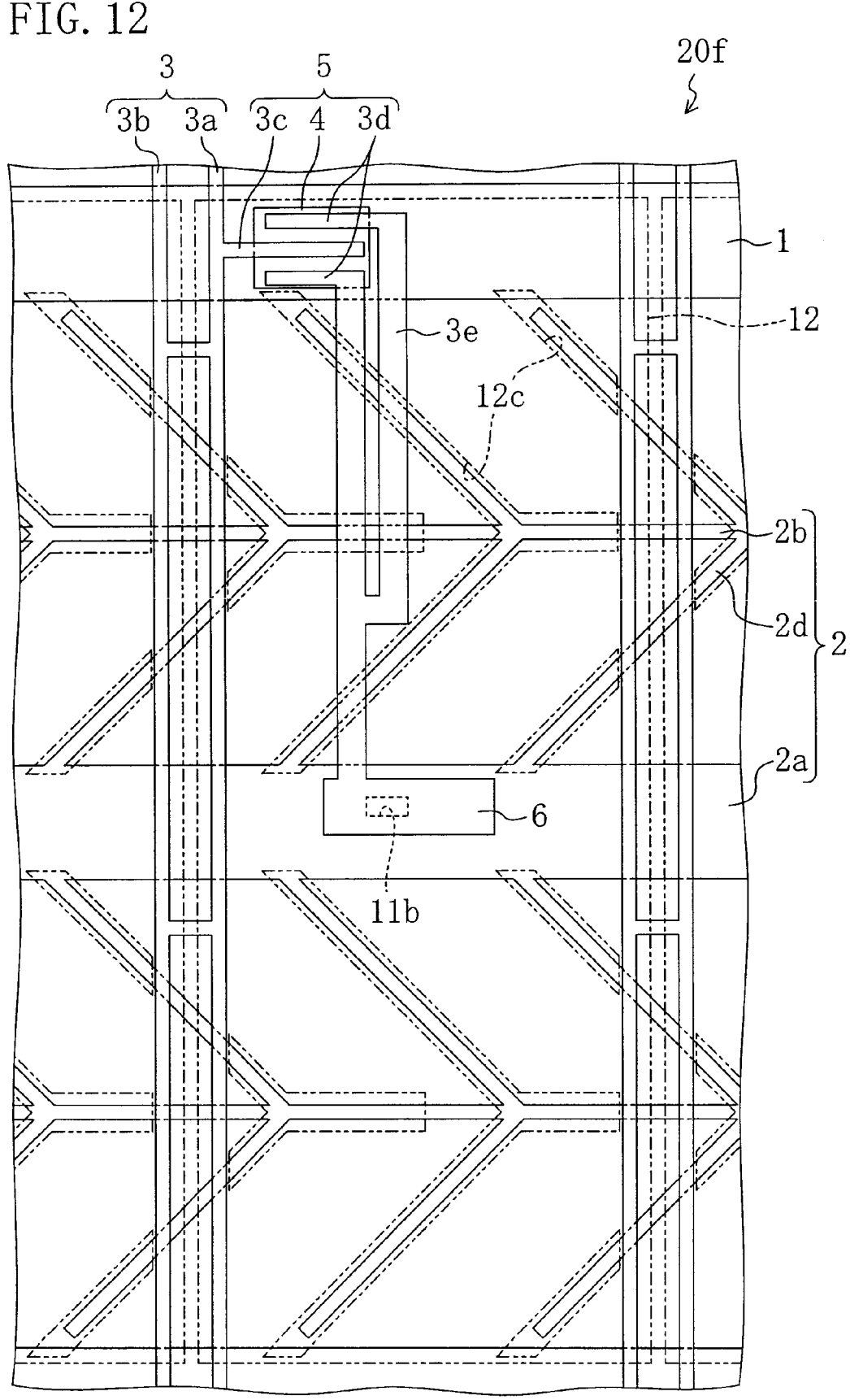
FIG. 12 is a plan view of an active matrix substrate according to a sixth preferred embodiment of the present invention.

FIG. 12 shows an active matrix substrate 20f of this preferred embodiment.

As shown in FIG. 12, in this active matrix substrate 20f, each TFT 5 is formed on a corresponding gate line 1 and each capacitor line 2 is formed by a first capacitor line 2a, a second capacitor line 2b, and a capacitor line branch portion 2d. The first capacitor line 2a extends laterally in the middle of the figure. The second capacitor line 2b extends in parallel with the first capacitor line 2a above and below the first capacitor line 2a in the figure. The capacitor line branch portion 2d extends in an oblique direction in the figure and is connected to the first capacitor line 2a and the second capacitor line 2b. Each pixel electrode 12 has a slit portion 12c that overlaps the second capacitor line 2b and the capacitor branch portion 2d.

More specifically, in each TFT 5, the gate line 1 serves also as a gate electrode, and two drain electrodes 3d are formed with a source electrode 3c interposed therebetween. The two drain electrodes 3d are extended to the region where the first capacitor line 2a is formed, and are connected to a corresponding capacitor electrode 6.

In this active matrix substrate 20f, each pixel electrode 12 has a slit portion 12c for dividing orientation of liquid crystal molecules and the slit portion 12c overlaps each capacitor line 2 (the second capacitor line 2b and the capacitor line branch portion 2d). The region where the slit portion 12c is formed usually does not function as a transparent region. Therefore, by forming each capacitor line 2 so that the capacitor line 2 overlaps this region, reduction in the aperture ratio resulting from formation of an auxiliary capacitor can be suppressed. Note that such an active matrix substrate is preferably used in an MVA mode liquid crystal display device.

An active matrix substrate having a slit portion 12c for separating orientation of liquid crystal molecules in each pixel electrode 12 is shown in this preferred embodiment. Alternatively, however, a projection (12c) of a photosensitive acrylic resin may be formed at a position corresponding to the slit portion 12c of the pixel electrode 12 in order to control orientation of liquid crystal molecules.

Seventh Preferred Embodiment

Figure 13:
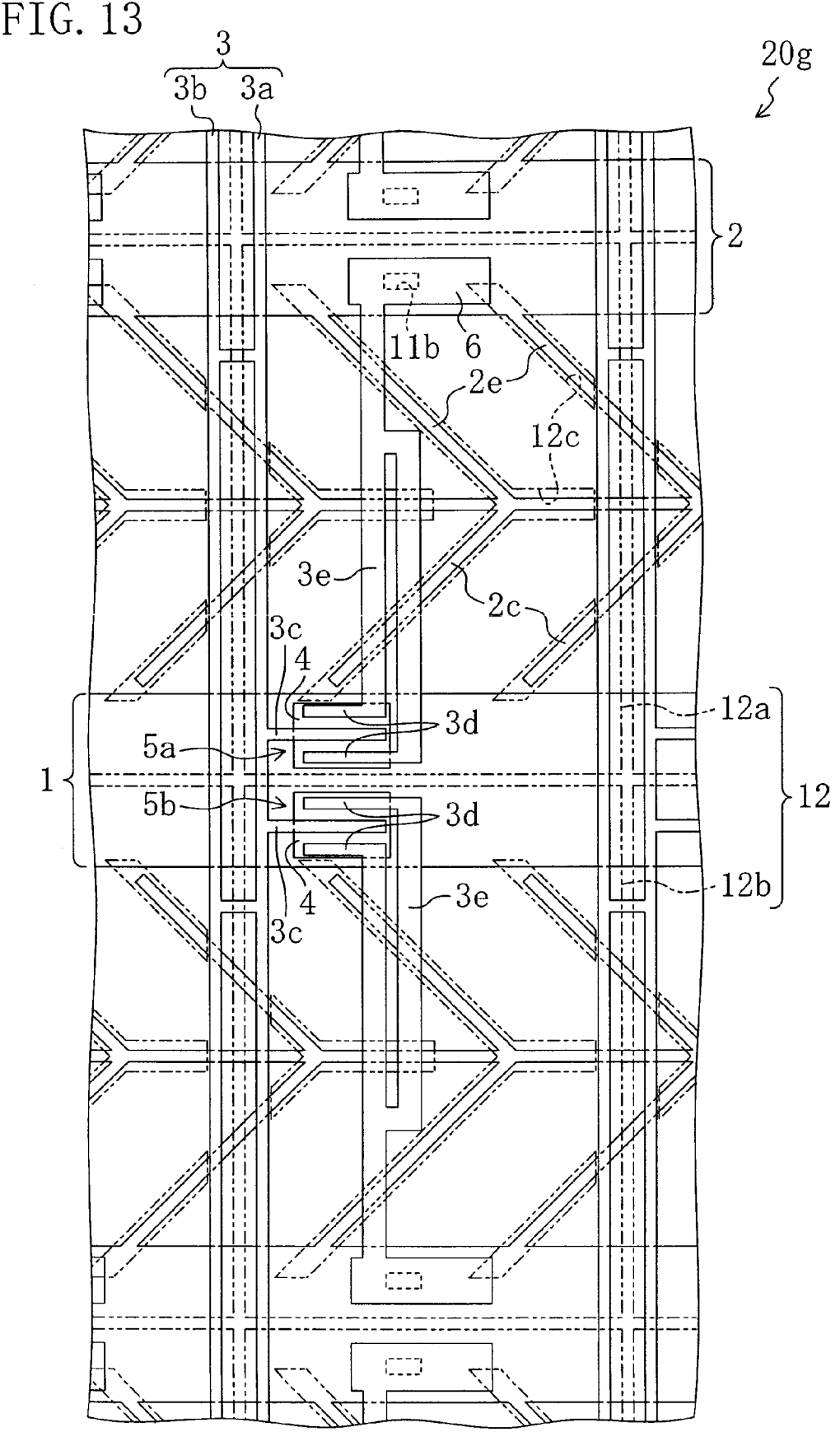
FIG. 13 is a plan view of an active matrix substrate according to a seventh preferred embodiment of the present invention.
Figure 14:
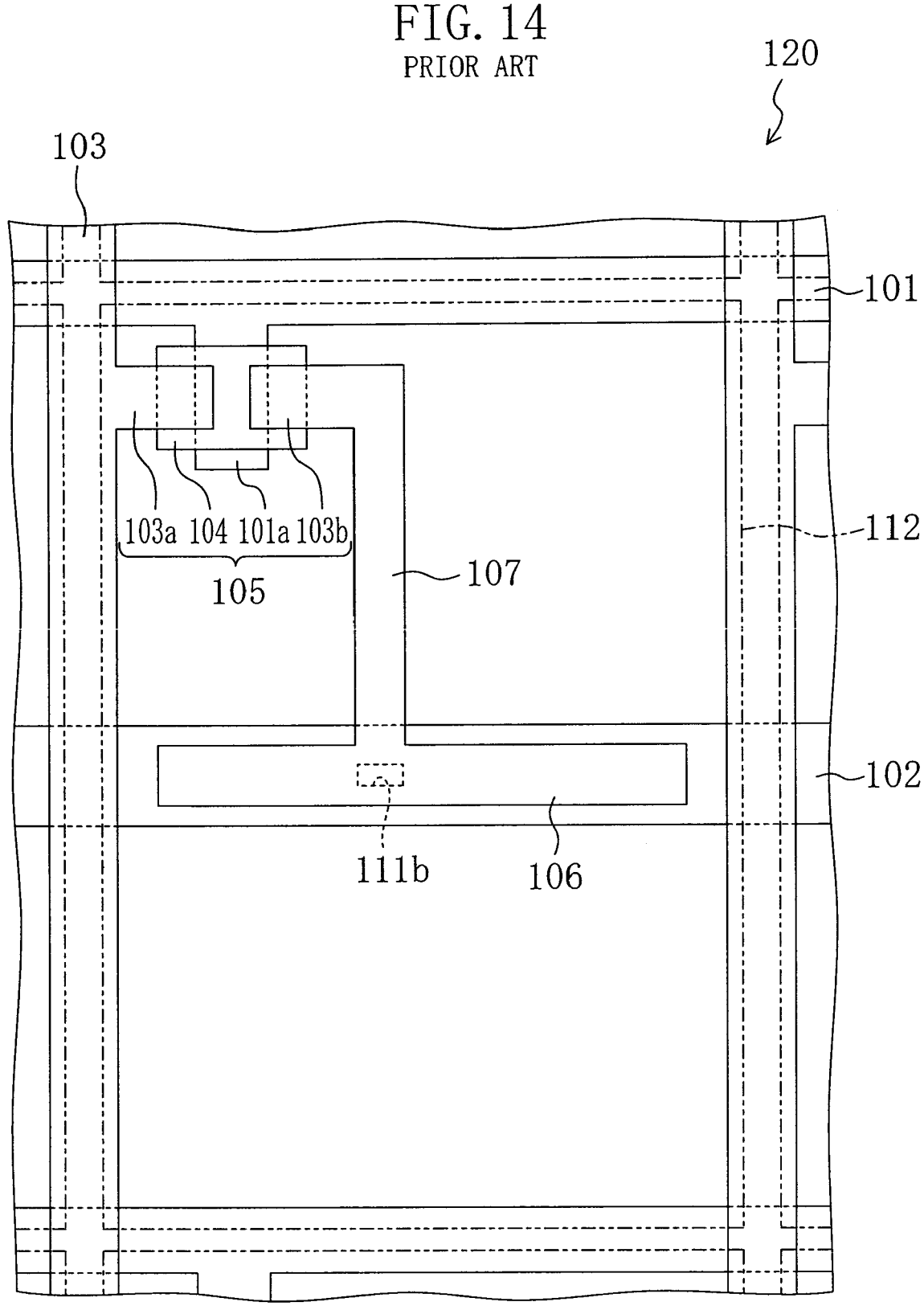
FIG. 14 is a plan view of a conventional active matrix 120.

FIG. 13 shows an active matrix substrate 20g of this preferred embodiment.

This active matrix substrate 20g is a modification of the sixth preferred embodiment and is capable of multi-pixel driving.

As shown in FIG. 13, this active matrix substrate 20g has a first TFT 5a and a second TFT 5b at each intersection of gate lines 1 and source lines 3, and each pixel electrode 12 is formed by a first pixel electrode 12a and a second pixel electrode 12b. The first pixel electrode 12a is connected to a drain electrode 3d (a capacitor electrode 6) of the first TFT 5 located on the upper side of the figure. The second pixel electrode 12b is connected to a drain electrode 3d (a capacitor electrode 6) of the second TFT 5b located on the lower side of the figure.

The active matrix substrate 20g is capable of multi-pixel driving. More specifically, the active matrix substrate 20g has pixel groups each formed by pixels which are to be selected by a gate signal supplied to the same gate line 1 and a source signal supplied to the same source line 3 and which receive the same source signal. In other words, each pixel group is formed by the pixels located adjacent to each other in the vertical direction in the figure (the first pixel electrode 12a and the second pixel electrode 12b), and the pixels of each pixel group are independently driven by respective TFTs (the first TFT 5a and the second TFT 5b). In this active matrix substrate 20g capable of multi-pixel driving, at least two pixels forming each pixel group are different in luminance when an image is displayed. For example, each pixel group can have a bright pixel and a dark pixel when signal voltages of opposite phases are applied to the capacitor lines 2 extending across the pixel group. More specifically, area gradation technology uses two kinds of Cs waveform voltages, that is, a Cs waveform voltage (Cs polarity +) contributing to pushing up a drain signal voltage (Vs) supplied from the source line 3 at timing for capacitive coupling when a scanning signal is off, and a Cs waveform voltage (Cs polarity −) contributing to pushing down the Vs. By using the area gradation technology, an effective voltage to be applied to each pixel group is varied on a pixel by pixel basis by capacitive coupling of the Cs waveform voltage, Cs capacitor, and liquid crystal capacitor, whereby bright and dark pixels can be formed. Examples of such a pixel division structure for providing display by using pixel division of each pixel group include a 1:1 pixel division structure in which the area of the bright pixel and the area of the dark pixel are equal to each other and a 1:3 pixel division structure in which the area of the bright pixel is one third of the area of the dark pixel. Among them, the 1:3 pixel division structure is particularly effective as a measure for whitening at oblique viewing angles on the display screen of the liquid crystal display device (a measure to implement a wider viewing angle).

In this active matrix substrate 20g, each pixel is independently driven in each pixel group. Therefore, both a bright pixel and a dark pixel can be present in each pixel group, and intermediate gray scales can be expressed by area gradation. As a result, whitening at oblique viewing angles on the display screen of the liquid crystal display device can be improved.

Accordingly, disconnection can be repaired also in the active matrix substrate capable of multi-pixel driving without degrading the effect of improving whitening.

In each of the above-described preferred embodiments, each of the area of the region where a first source line overlaps a capacitor line and the area of the region where a second source line overlaps a capacitor line is 25 $\mu m^2$ or more. In this case, a sufficient laser radiation region is ensured in the process of melting an insulating film between the first source line 3a and the second source line 3 and the capacitor line 3 by using a YAG laser or the like. As a result, improved reliability of electric conduction between the first source line and the second source line and the capacitor line can be implemented.

As has been described above, the present invention is capable of repairing disconnection in an active matrix substrate of a liquid crystal display device while suppressing generation of pixel defects. Therefore, the invention is useful for a display device having an active matrix substrate.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An active matrix substrate, comprising:
   a plurality of pixel electrodes arranged in a matrix pattern and defining pixels;
   a plurality of gate lines each provided between corresponding ones of the plurality of pixel electrodes and extending substantially in parallel with each other;
   a plurality of first source lines each provided between corresponding ones of the plurality of pixel electrodes and extending in a direction crossing an extending direction of the plurality of gate lines;
   a plurality of switching elements provided corresponding to respective ones of the plurality of pixel electrodes and connected to respective ones of the plurality of pixel electrodes, respective ones of the plurality of gate lines, and respective ones of the plurality of first source lines;
   a plurality of capacitor lines each provided between corresponding ones of the plurality of gate lines and extending substantially in parallel with each other; and
   a plurality of second source lines each provided between the same corresponding ones of the plurality of pixel electrodes as respective ones of the plurality of first source lines and extending directly adjacent to and substantially in parallel with the respective ones of the plurality of first source lines over an entire side of the pixels.

2. The active matrix substrate according to claim 1, wherein the first source line and the second source line are connected to each other.

3. The active matrix substrate according to claim 1, wherein each of the capacitor lines is defined by a first capacitor line and a second capacitor line that extend substantially in parallel with each other.

4. The active matrix substrate according to claim 3, wherein the first capacitor line and the second capacitor line are connected to each other.

5. The active matrix substrate according to claim 1, wherein each of the capacitor lines is extended at every pixel so as to have a capacitor line extension portion extending along the capacitor line and having a portion overlapping a corresponding first source line and a portion overlapping a corresponding second source line.

6. The active matrix substrate according to claim 1, wherein capacitor electrodes are arranged so as to overlap the respective capacitor lines with a dielectric film interposed therebetween.

7. The active matrix substrate according to claim 6, wherein an interlayer insulating film is provided between the switching elements and the capacitor electrodes and the pixel electrodes, each of the plurality of switching elements has a drain electrode connected to the corresponding pixel electrode, and the drain electrodes and the capacitor electrodes are connected to the respective pixel electrodes through respective contact holes formed in the interlayer insulating film.

8. The active matrix substrate according to claim 7, wherein the drain electrode is extended and connected to a corresponding capacitor electrode.

9. The active matrix substrate according to claim 1, wherein each of the plurality of pixel electrodes has a slit portion arranged to divide orientation of liquid crystal molecules or a projection arranged to control orientation of liquid crystal molecules, and the slit portion and the projection overlap a corresponding capacitor line.

10. The active matrix substrate according to claim 4, wherein adjacent pixels of the plurality of pixels define a pixel group, and at least two pixels of the pixel group are different in luminance when an image is displayed.

11. The active matrix substrate according to claim 1, wherein each of an area of a region where each of the first source lines overlaps a corresponding capacitor line and an area of a region where each of the second source lines overlaps a corresponding capacitor line is about 25 $\mu m^2$ or more.

12. A display device comprising the active matrix substrate of claim 1.

13. A television apparatus comprising the display device of claim 12 and a tuner portion for receiving television broadcasting.

14. A manufacturing method of an active matrix substrate including a plurality of pixel electrodes arranged in a matrix pattern and each forming a pixel, a plurality of gate lines each provided between the corresponding pixel electrodes and extending substantially in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending substantially in parallel with each other, and a plurality of second source lines each provided between the corresponding pixel electrodes and extending substantially in parallel with the first source lines, comprising:
   the step of detecting disconnection of a gate line;
   the step of forming a source line bypassing portion by cutting each second source line provided along both sides of a pixel electrode of a pixel corresponding to a disconnected location of the gate line detected in the disconnection detecting step at a position located beyond a capacitor line extending across the pixel electrode and a position located beyond the disconnected gate line, so that each source line bypassing portion has a portion overlapping the capacitor line and a portion overlapping the gate line;

the step of forming a capacitor line bypassing portion by cutting the capacitor line extending across the pixel electrode of the pixel corresponding to the disconnected location of the gate line detected in the disconnection detecting step at a position located beyond each second source line provided along both sides of the pixel electrode of the pixel corresponding to the disconnected location, so that the capacitor line bypassing portion has a portion overlapping one of the second source lines and a portion overlapping another second source line; and the step of connecting the respective portions of the source line bypassing portions overlapping the gate line with the disconnected gate line and connecting the respective portions of the source line bypassing portions overlapping the capacitor line with the capacitor line bypassing portion.

15. A manufacturing method of an active matrix substrate including a plurality of pixel electrodes arranged in a matrix pattern and each forming a pixel, a plurality of gate lines each provided between the corresponding pixel electrodes and extending substantially in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending in parallel with each other, and a plurality of second source lines each provided between the corresponding pixel electrodes and extending substantially in parallel with the first source lines, comprising:

the step of detecting disconnection of a first source line;

the step of forming a capacitor line bypassing portion by cutting a capacitor line extending across a pixel electrode of a pixel corresponding to a disconnected location of the first source line detected in the disconnection detecting step at positions located outside the disconnected first source line and a second source line adjacent to the first source line, so that the capacitor line bypassing portion has a portion overlapping the first source line and a portion overlapping the second source line; and the step of connecting the portion of the capacitor line bypassing portion overlapping the first source line with the disconnected first source line and connecting the portion of the capacitor line bypassing portion overlapping the second source line with the second source line.

16. A manufacturing method of an active matrix substrate including a plurality of pixel electrodes arranged in a matrix pattern and each forming a pixel, a plurality of gate lines each provided between the corresponding pixel electrodes and extending substantially in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending in parallel with each other, a plurality of second source lines each provided between the corresponding pixel electrodes and extending substantially in parallel with the first source lines, and a capacitor line extension portion extended from each capacitor line at every pixel so as to extend along the capacitor line and having a portion overlapping a corresponding first source line and a portion overlapping a corresponding second source line, comprising:

the step of detecting disconnection of a capacitor line;

the step of forming a source line bypassing portion by cutting a first source line and a second source line provided along both sides of a pixel electrode of a pixel corresponding to a disconnected location of the capacitor line detected in the disconnection detecting step at a position located beyond the disconnected capacitor line and a position located beyond a capacitor line extension portion extended from the capacitor line, so that each source line bypassing portion has a portion overlapping the capacitor line and a portion overlapping the capacitor line extension portion; and the step of connecting the respective portions of the source line bypassing portions overlapping the capacitor line with the disconnected capacitor line and connecting the respective portions of the source line bypassing portions overlapping the capacitor line extension portion with the capacitor line extension portion.

17. The manufacturing method according to claim 14, wherein the cutting and the connection are conducted by laser radiation.

18. The manufacturing method according to claim 17, wherein the cutting is conducted by a fourth harmonic wave of a YAG laser.

19. The manufacturing method according to claim 17, wherein the connection is conducted by a second harmonic wave of a YAG laser.

20. A manufacturing method of a display device having an active matrix substrate including a plurality of pixel electrodes arranged in a matrix pattern and each forming a pixel, a plurality of gate lines each provided between the corresponding pixel electrodes and extending substantially in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending substantially in parallel with each other, and a plurality of second source lines each provided between the corresponding pixel electrodes and extending substantially in parallel with the first source lines, comprising:

the step of detecting disconnection of a gate line;

the step of forming a source line bypassing portion by cutting each second source line provided along both sides of a pixel electrode of a pixel corresponding to a disconnected location of the gate line detected in the disconnection detecting step at a position located beyond a capacitor line extending across the pixel electrode and a position located beyond the disconnected gate line, so that each source line bypassing portion has a portion overlapping the capacitor line and a portion overlapping the gate line;

the step of forming a capacitor line bypassing portion by cutting the capacitor line extending across the pixel electrode of the pixel corresponding to the disconnected location of the gate line detected in the disconnection detecting step at a position located beyond each second source line provided along both sides of the pixel electrode of the pixel corresponding to the disconnected location, so that the capacitor line bypassing portion has a portion overlapping one of the second source lines and a portion overlapping another second source line; and the step of connecting the respective portions of the source line bypassing portions overlapping the gate line with the disconnected gate line and connecting the respective portions of the source line bypassing portions overlapping the capacitor line with the capacitor line bypassing portion.

21. A manufacturing method of a display device having an active matrix substrate including a plurality of pixel electrodes arranged in a matrix pattern and each forming a pixel, a plurality of gate lines each provided between the corresponding pixel electrodes and extending substantially in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending substantially in parallel with each other, and a plurality of second source lines each provided between the corresponding pixel electrodes and extending substantially in parallel with the first source lines, comprising:

the step of detecting disconnection of a first source line;

the step of forming a capacitor line bypassing portion by cutting a capacitor line extending across a pixel electrode of a pixel corresponding to a disconnected location of the first source line detected in the disconnection detecting step at positions located outside the disconnected first source line and a second source line adjacent to the first source line, so that the capacitor line bypassing portion has a portion overlapping the first source line and a portion overlapping the second source line; and the step of connecting the portion of the capacitor line bypassing portion overlapping the first source line with the disconnected first source line and connecting the portion of the capacitor line bypassing portion overlapping the second source line with the second source line.

22. A manufacturing method of a display device having an active matrix substrate including a plurality of pixel electrodes arranged in a matrix pattern and each forming a pixel, a plurality of gate lines each provided between the corresponding pixel electrodes and extending substantially in parallel with each other, a plurality of first source lines each provided between the corresponding pixel electrodes and extending in a direction crossing an extending direction of the gate lines, a plurality of switching elements provided corresponding to the respective pixel electrodes and connected to the respective pixel electrodes, the respective gate lines, and the respective first source lines, a plurality of capacitor lines each provided between the corresponding gate lines and extending substantially in parallel with each other, a plurality of second source lines each provided between the corresponding pixel electrodes and extending substantially in parallel with the first source lines, and a capacitor line extension portion extended from each capacitor line at every pixel so as to extend along the capacitor line and having a portion overlapping a corresponding first source line and a portion overlapping a corresponding second source line, comprising:

the step of detecting disconnection of a capacitor line;

the step of forming a source line bypassing portion by cutting a first source line and a second source line provided along both sides of a pixel electrode of a pixel corresponding to a disconnected location of the capacitor line detected in the disconnection detecting step at a position located beyond the disconnected capacitor line and a position located beyond a capacitor line extension portion extended from the capacitor line, so that each source line bypassing portion has a portion overlapping the capacitor line and a portion overlapping the capacitor line extension portion; and the step of connecting the respective portions of the source line bypassing portions overlapping the capacitor line with the disconnected capacitor line and connecting the respective portions of the source line bypassing portions overlapping the capacitor line extension portion with the capacitor line extension portion.

23. The manufacturing method according to claim 20, wherein the cutting and the connection are conducted by laser radiation.

24. The manufacturing method according to claim 23, wherein the cutting is conducted by a fourth harmonic wave of a YAG laser.

25. The manufacturing method according to claim 23, wherein the connection is conducted by a second harmonic wave of a YAG laser.

* * * * *